United States Patent
Takaki

(10) Patent No.: US 10,178,929 B2
(45) Date of Patent: Jan. 15, 2019

(54) REMOVABLE WASHER

(71) Applicant: Masahiro Takaki, Musashino (JP)

(72) Inventor: Masahiro Takaki, Musashino (JP)

(73) Assignee: MASAHIRO TAKAKI, Musashino-Shi (JP)

( * ) Notice: Subject to any disclaimer, the term of this patent is extended or adjusted under 35 U.S.C. 154(b) by 0 days.

(21) Appl. No.: 15/311,707

(22) PCT Filed: Sep. 3, 2015

(86) PCT No.: PCT/JP2015/075046
§ 371 (c)(1),
(2) Date: Nov. 16, 2016

(87) PCT Pub. No.: WO2016/039246
PCT Pub. Date: Mar. 17, 2016

(65) Prior Publication Data
US 2017/0079488 A1  Mar. 23, 2017

(30) Foreign Application Priority Data
Sep. 9, 2014  (JP) ................. 2014-183196

(51) Int. Cl.
| A47L 1/08 | (2006.01) |
| A47L 1/15 | (2006.01) |
| B60S 3/06 | (2006.01) |
| A47L 1/06 | (2006.01) |

(52) U.S. Cl.
CPC ............. *A47L 1/15* (2013.01); *A47L 1/06* (2013.01); *B60S 3/06* (2013.01); *A47L 1/08* (2013.01)

(58) Field of Classification Search
CPC ..... A47L 1/06; A47L 1/08; A47L 1/15; A47L 13/11; A47L 13/12; B60S 3/045
USPC ............................. 15/121, 220.1
See application file for complete search history.

(56) References Cited

U.S. PATENT DOCUMENTS

| 5,271,682 A | * | 12/1993 | Realdon ................ A47L 1/08 401/146 |
| 6,065,890 A |  | 5/2000 | Weitz |
| 8,499,404 B2 | * | 8/2013 | Spoleti ................ A47L 13/11 15/121 |

FOREIGN PATENT DOCUMENTS

| GB | 2005994 | 5/1979 |
| JP | 1974-135252 U | 11/1974 |
| JP | 1979-114467 U | 8/1979 |
| JP | 2010-213732 A | 9/2010 |
| JP | 2012-040066 A | 3/2012 |

OTHER PUBLICATIONS

Search Report issued in World Intellectual Property Organization Patent Application No. PCT/JP2015/075046, dated Dec. 15, 2015, along with an english translation thereof.

* cited by examiner

*Primary Examiner* — Michael Jennings
(74) *Attorney, Agent, or Firm* — Greenblum & Bernstein, P.L.C.

(57) ABSTRACT

This invention provides a removable washer that is attachable to a squeegee without dissembling the squeegee. A removable washer is removably attachable to a squeegee including a channel attached to a flat portion at a distal end of a handle. The removable washer includes a main body including an impregnation body, and an attachment portion that allows the main body to be removably attached to the handle of the squeegee. The attachment portion includes a clamping portion that removably clamps the flat portion of the handle of the squeegee.

14 Claims, 21 Drawing Sheets

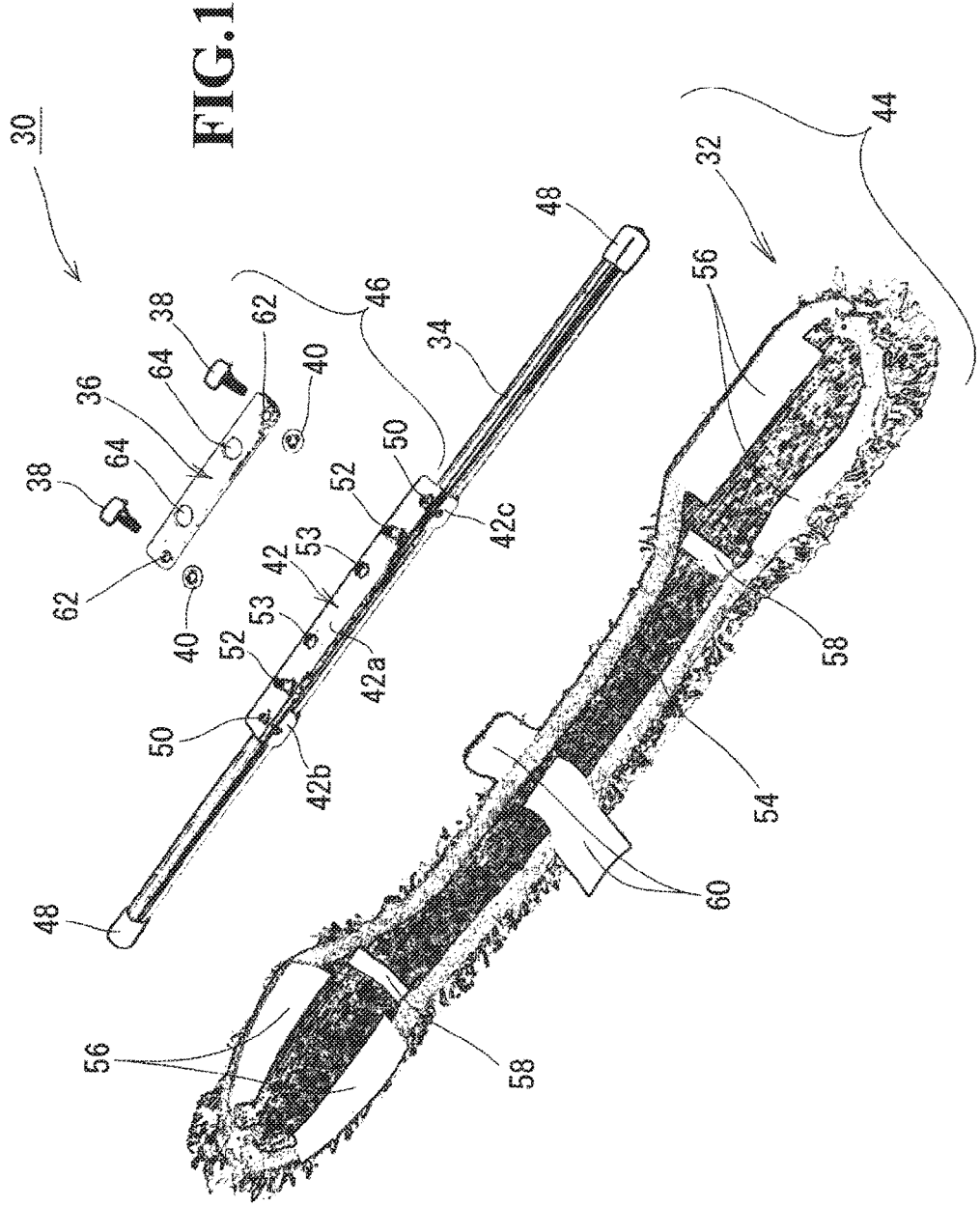

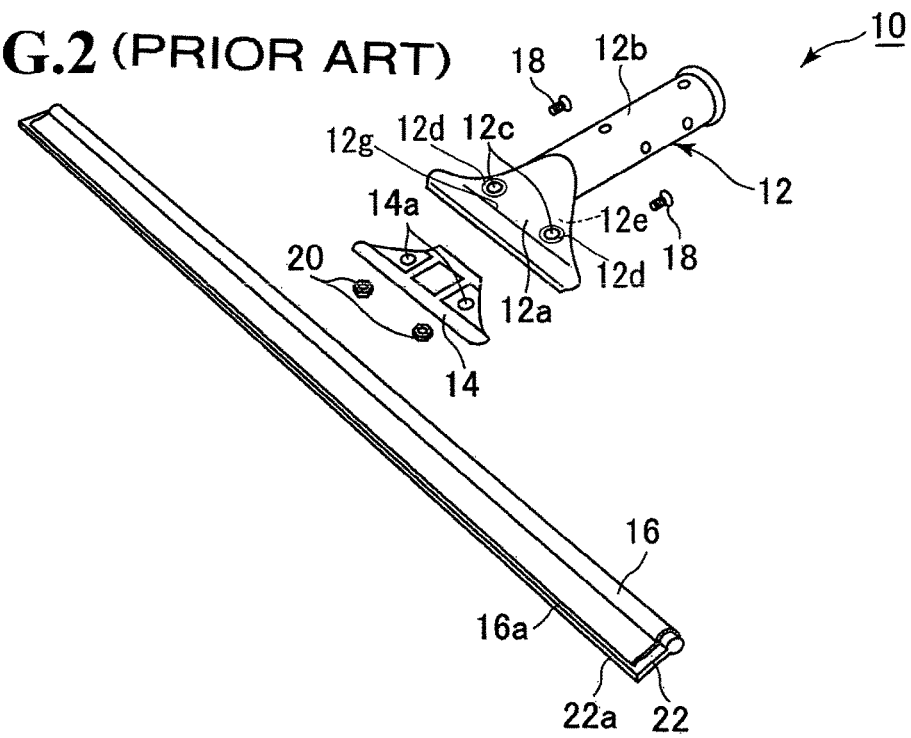
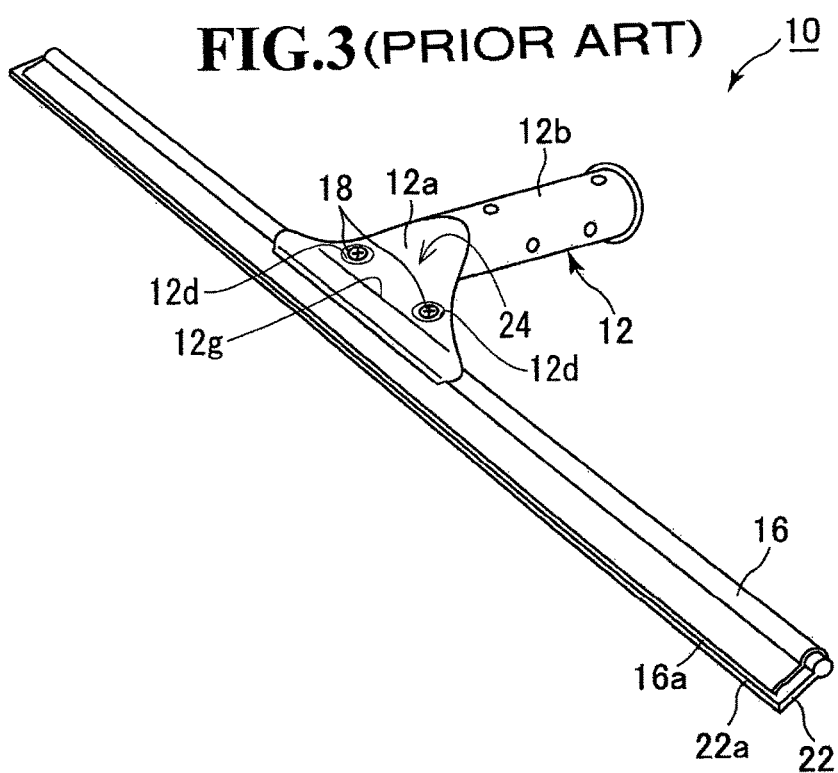

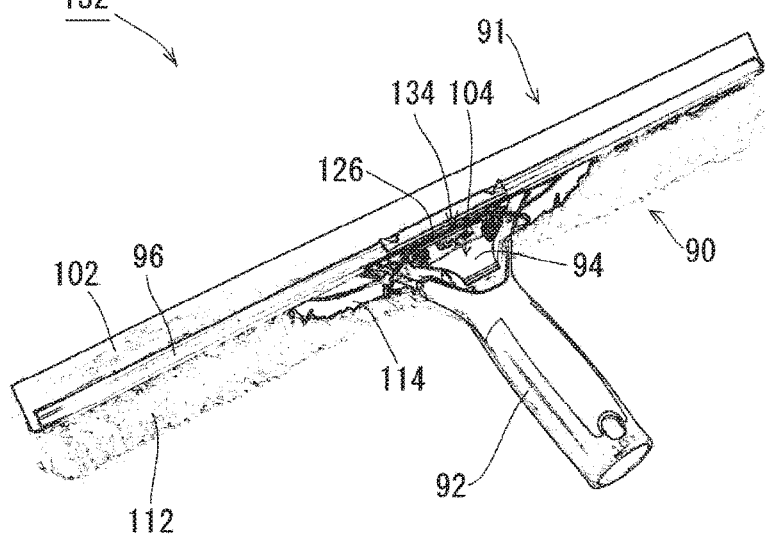
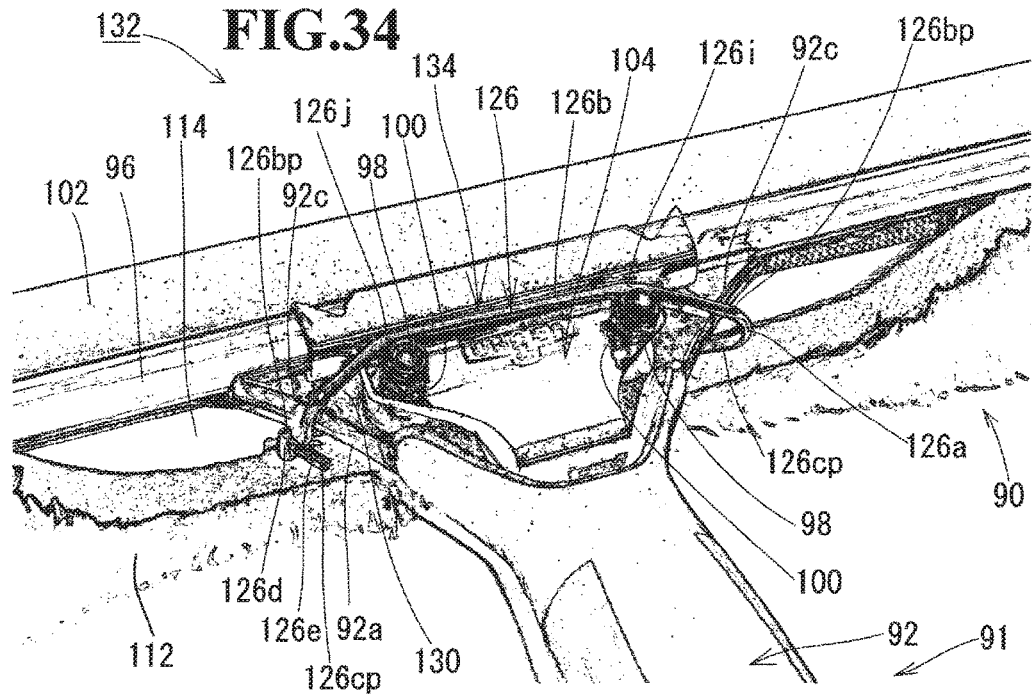

REMOVABLE WASHER

The disclosure of Japanese Patent Application No. JP2014-183196 filed on Sep. 9, 2014 including the specification, drawings, claims and abstract is incorporated herein by reference in its entirety.

TECHNICAL FIELD

This invention relates to a removable washer which is to be removably attached to a squeegee, which is a glass window cleaning tool, and to be used. The removable washer is configured so as to be attachable to a squeegee without disassembling the squeegee.

BACKGROUND ART

Examples of removable washers are described in Patent Literatures 1 and 2.

CITATION LIST

Patent Literature

Patent Literature 1: Japanese Patent Laid-Open No. 2010-213732
Patent Literature 2: Japanese Patent Laid-Open No. 2012-040066

SUMMARY OF INVENTION

Technical Problem

The removable washers described in Patent Literatures 1 and 2 both cannot be attached to a squeegee unless the squeegee is disassembled first.

This invention provides a removable washer configured so as to be attachable to a squeegee without disassembling the squeegee.

Solution to Problem

In this invention, a washer is configured so as to be attachable to a squeegee including a flat portion at a distal end of a handle and a channel attached to the flat portion, in such a manner that the washer clamps the flat portion, enabling the washer to be attached to the flat portion without disassembling the squeegee.

An aspect of a removable washer according to this invention includes a main body including an impregnation body, and an attachment portion that allows the main body to be removably attached to the handle, and the attachment portion includes a clamping portion that removably clamps a flat portion of the handle. According to the above, the clamping portion clamps the flat portion of the handle, enabling the washer to be attached to the squeegee without disassembling the squeegee.

In the above aspect, it is possible that the clamping portion includes: oppositely disposed portions disposed facing each other, the oppositely disposed portions clamping the flat portion of the handle in a thickness direction of the flat portion therebetween; and a fastening mechanism that fastens the oppositely disposed portions to each other to cause the oppositely disposed portions to clamp the flat portion of the handle therebetween. According to the above, the fastening mechanism fastens the oppositely disposed portions to each other to cause the oppositely disposed portions to clamp the flat portion of the handle therebetween, enabling the washer to be attached to the squeegee. Since the flat portion is flat, the flat portion can stably be clamped by the oppositely disposed portions.

In the above aspect, it is possible that the oppositely disposed portions each include an extension disposed so as to extend on each of a right side and a left side of the flat portion of the handle; and the fastening mechanism fastens the oppositely disposed portions to each other via the right and left extensions. According to the above, the fastening mechanism fastens the oppositely disposed portions to each other is the right and left extensions to cause the oppositely disposed portions to clamp the flat portion of the handle therebetween, enabling the washer to be attached to the squeegee.

In the above aspect, it is possible that the oppositely disposed portions include an engagement portion that can be engaged with at least any one of a channel attachment screw attached to the flat portion of the squeegee, a nut screwed to the screw, an obliquely rising cutout in a lower surface of the handle of the squeegee, a rising portion at a position on a front side of a back plate of the squeegee and a rising portion at a position on a front side of a head of the handle of the squeegee. According to the above, the engagement portion enables suppression of large displacement of the washer relative to the squeegee (e.g., inclination in a longitudinal direction of the main body of the washer relative to a longitudinal direction of the channel).

BRIEF DESCRIPTION OF THE DRAWINGS

FIG. 1 is an exploded perspective view illustrating components of a removable washer according to Embodiment 1 of this invention.

FIG. 2 is an exploded perspective view illustrating components of a conventional squeegee as viewed from the back side.

FIG. 3 is a perspective view of the squeegee in FIG. 2 as assembled and viewed from the back side.

FIG. 8A is a diagram illustrating a state immediately before the attachment and is a cross-sectional view along a plane extending through a center line of the squeegee and perpendicular to a longitudinal direction of a channel.

FIG. 8B is a diagram illustrating a state after completion of the attachment, following the state immediately before the attachment in FIG. 8A and is a cross-sectional view along the plane that is the same as that of the FIG. 8A.

FIG. 33 is a perspective view of the combination squeegee in FIG. 32 as viewed from the front side of the squeegee.

FIG. 34 is an enlarged view of a clamping portion in FIG. 33.

DESCRIPTION OF EMBODIMENTS

Embodiment 1

Figure 4:
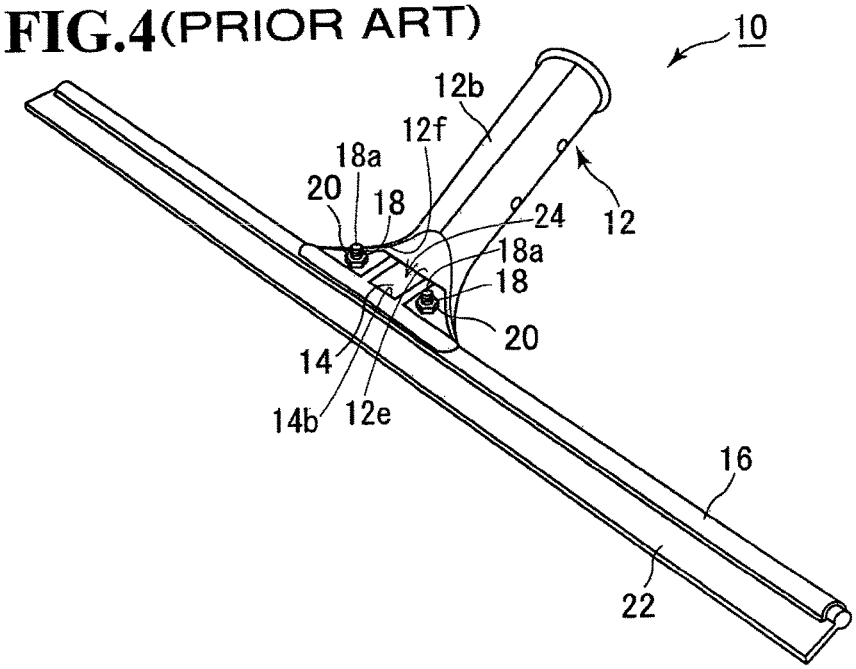
FIG. 4 is a perspective view of the squeegee in FIG. 2 as assembled and viewed from the front side.

Embodiment 1 of a removable washer according to this invention will be described. First, a conventional squeegee to which a removable washer according to Embodiment 1 is removably attachable will be described with reference to FIGS. 2 to 4. FIG. 2 illustrates components of the conventional squeegee. Although FIG. 2 indicates a case where a handle of a "Master Squeegee" manufactured by Ettore Products Company is used, other companies also have products of a type similar to the above. A squeegee 10 is formed of a handle (gripper) 12 of a metal, a back plate 14 of a metal, a channel (transverse bar) 16 of a metal, two screws 18, two nuts 20, and a rubber 22 fitted on the channel 16 along a longitudinal direction thereof (long elastic plate of, e.g., rubber) 22. A head 12a at a distal end of the handle 12 is formed in a fan-like shape that is wide compared to a grip 12b. In the head 12a, a recess 12d is formed at each of two places of right and left. At a center of each recess 12d, a screw passing hole 12c is formed. The back plate 14 is formed in a fan-like shape of a size that allows the back plate 14 to be received in a depression 12e on the front side of the head 12a. Here, in the squeegee 10 and the components thereof, from among the respective opposite sides, the side facing a glass window when the glass window is rubbed with the squeegee 10 is referred to as "front side" and the side opposite to the front side is referred to as "back side". In the back plate 14, a screw passing hole 14a is formed at each of two places facing the two screw passing holes 12c of the head 12a. The back plate 14 is received in the depression 12e on the front side of the head 12a of the handle 12, the channel 16 is put into a distal end between the head 12a and the back plate 14, two screws 18 are inserted into the screw passing holes 12c and 14a from the back side of the handle 12, and the nuts 20 are screwed and fastened to respective ends of the screws 18, the ends projecting from the front side of the back plate 14, whereby the handle 12 and the back plate 14 are joined to each other and the channel 16 is clamped at the distal end between the head 12a of the handle 12 and the back plate 14, and the handle 12, the back plate 14 and the channel 16 are assembled and integrated in such a manner that disassembling is possible. FIGS. 3 and 4 illustrate the squeegee 10 assembled as described above, as viewed from the back side and the front side, respectively. A front edge 22a of the rubber 22 slightly projects from a front edge 16a of the channel 16 so as to be able to rub a wash solution off from a surface of the glass window. The head 12a at the distal end of the handle 12 forms a flat portion 24 that is flat compared to the grip 12b.

A washer according to Embodiment 1 that can be attached directly to either of the back side and the front side of the squeegee 10 assembled as in FIGS. 3 and 4 will be described. FIG. 1 is an exploded perspective view of a removable washer 30 according to Embodiment 1, A washer 30 includes, e.g., an impregnation body 32, a rod-like (straight rod-shaped) core member 34, a plate 36, two hand screws 38, retaining washers 40 for the hand screws 38. On the core member 34, a support base 42 is attached to a center in a longitudinal direction of the core member 34 via, e.g., rivets. The impregnation body 32 and the core member 34 form a main body 44 of the washer 30. The support base 42, the plate 36, the hand screws 38 and the retaining washers 40 form an attachment portion 46 that removably attaches the main body 44 to the squeegee 10.

The core member 34 is formed of, for example, an aluminum circular pipe (straight pipe) having a diameter of around 10 mm and a length that is roughly equal to that of the channel 16. Each of opposite ends of the core member 34 is covered by and thereby fitted with a cap 48 of, e.g., vinyl or rubber. On the core member 34, the support base 42 is attached to the center in the longitudinal direction of the core member 34 via two blind rivets (drawing rivets) 50. The support base 42 is formed of, for example, an aluminum plate having a thickness of around 1.5 mm.

Figure 5:
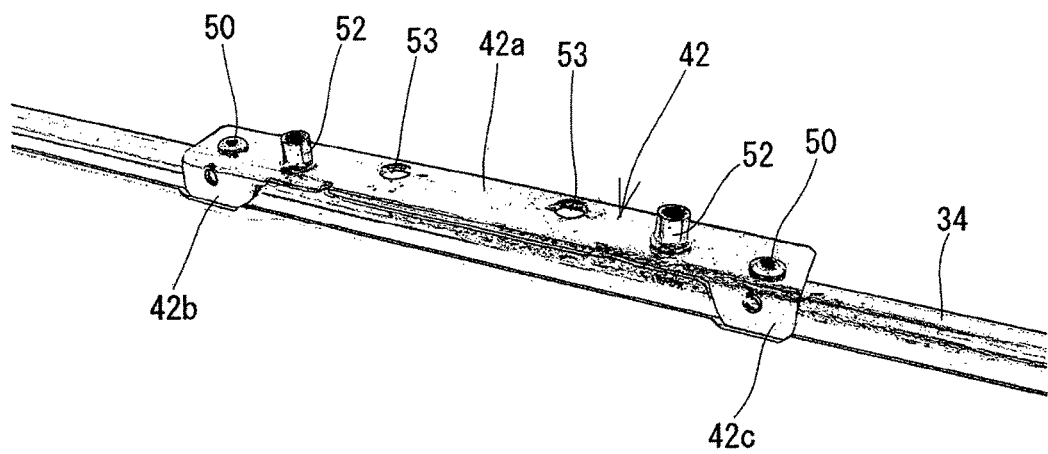
FIG. 5 is an enlarged view of a part of a core member in FIG. 1 to which a support base is attached.
Figure 6:
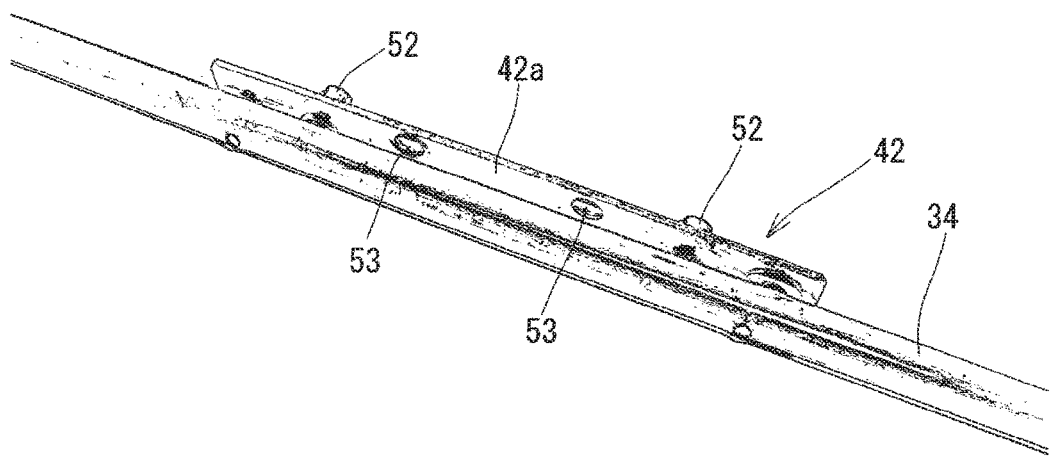
FIG. 6 is an enlarged view of the part in FIG. 5 as viewed from the rear side.
Figure 16:
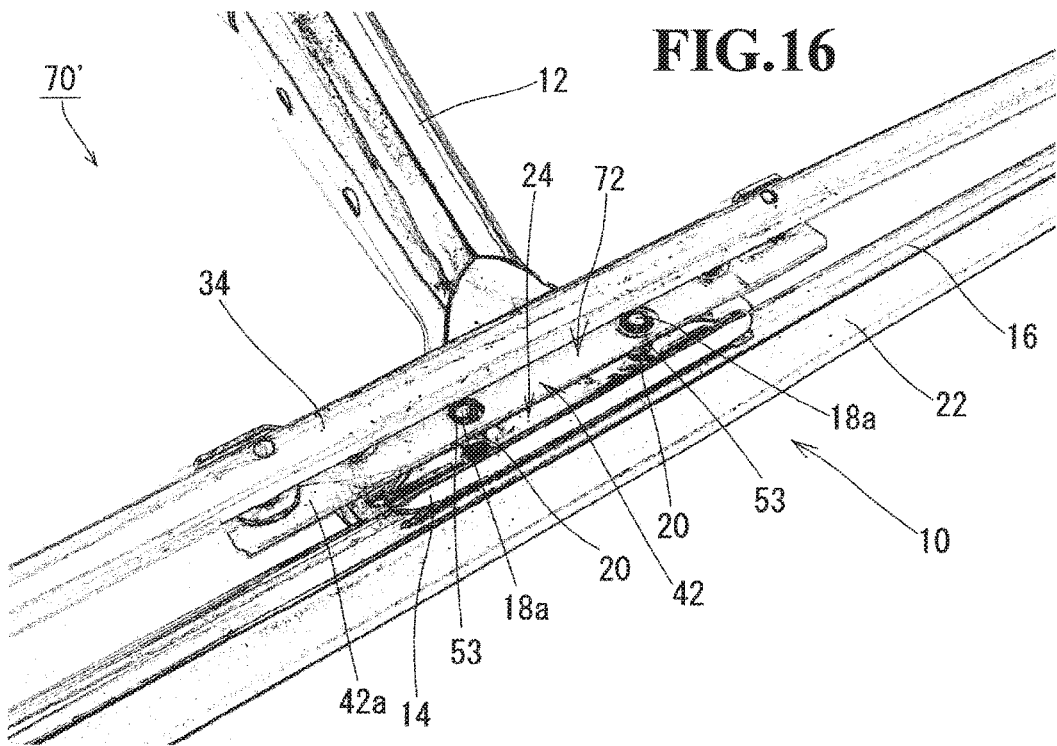
FIG. 16 is a diagram of the combination squeegee in FIGS. 13 to 15 with the impregnation body removed and is a perspective view as viewed from the front side of the squeegee.

A configuration of the support base 42 will be described with reference to the enlarged views in FIGS. 5 and 6. The support base 42 includes a base portion 42a, and backs 42b and 42c, which are bent at a right angle relative to the base portion 42a at respective positions around opposite ends in a longitudinal direction of the base portion 42a. The core member 34 is fixed to the base portion 42a via the two blind rivets 50 in a state in which the core member 34 is supported by respective inner surfaces of the base portion 42a and the backs 42b and 42c. A female threaded rivet 52 is attached at each of two positions close to the center relative to the respective ends of the base portion 42a in the longitudinal direction. In other words, the female threaded rivets 52 are attached to the base portion 42a so as to project, at right, angle from a surface of the base portion 42a toward the side opposite to the side on which the core member 34 is disposed. In a surface of a projecting distal end of each female threaded rivet 52, a female threaded opening is formed. A distance between the two female threaded rivets 52 and 52 is set to a distance that allows the flat portion 24 of the squeegee 10 to be received in a space between the rivets 52 and 52. Two circular holes 53 are formed at respective positions between the two female threaded rivets 52 in the base portion 42a. When the washer 30 is attached to the front side of the squeegee 10 (FIGS. 13 to 16), the circular holes 53 receive respective distal end parts 18a (FIG. 4) of the screws 18 of the squeegee 10, the distal end parts 18a projecting from the respective nuts 20 (FIG. 16). Consequently, the circular holes 53 serve to suppress large displacement of the washer 30 relative to the squeegee 10 (e.g., inclination in a longitudinal direction of the main body 44 relative to a longitudinal direction of the channel 16).

Figure 7:
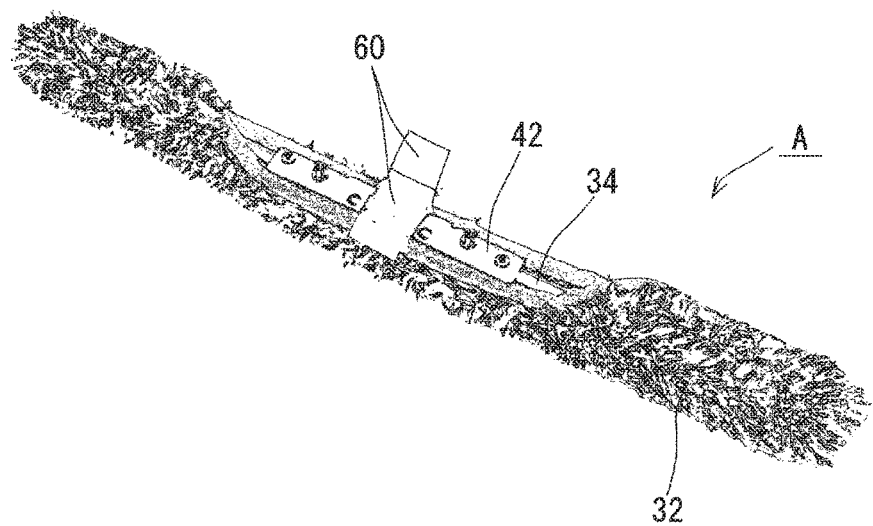
FIG. 7 is a perspective view illustrating an assembled part obtained by an impregnation body being assembled to the core member in FIG. 1.

In FIG. 1, for the impregnation body 32, a raised fabric having a raised front surface is used and the impregnation body 32 is fabricated by sewing the fabric into a sac-like shape. At a side of the impregnation body 32, an opening 54 for inserting/removing the core member 34 is formed over a substantially entire length of the side. At parts around opposite ends in a longitudinal direction of the opening 54 in an inner circumferential surface of the opening 54 of the impregnation body 32, two pairs of hook-and-loop fasteners 56 for openably closing the parts around the opposite ends of the opening 54 are sewn and thereby attached along edges of the opening 54 that face each other. An elastic string 58 is sewn and attached at each of two positions close to a center relative to the opposite ends in the longitudinal direction of the opening 54 in the inner circumferential surface of the opening 54 of the impregnation body 32. These elastic strings 58 are intended to let right and left parts of the core member 34 through, respectively. In the impregnation body 32, at a center position in the longitudinal direction of the impregnation body 32, a pair of hook-and-loop fasteners 60 for openably closing a part at the center position of the opening 54 is sewn and attached to edges of the opening 54 that face each other. According to the above configuration, while the right and left parts of the core member 34 are let through via the respective elastic strings 58, the core member 34 is inserted to the inside of the impregnation body 32 from the opening 54, and subsequently, the right and left hook-and-loop fasteners 56 and the center hook-and-loop fastener 60 are closed, whereby assembled part A in which the core member 34 is covered by the impregnation body 32, which is illustrated in FIG. 7, is formed.

In FIG. 1, the plate 36 is formed of, for example, an aluminum plate (flat plate) having a thickness of around 2 mm. In the plate 36, two screw passing holes 62 for letting shafts (threaded portions) of the two hand screws 38 therethrough are formed at respective positions around opposite ends in a longitudinal direction of the plate 36. A distance between axes of the two screw passing holes 62 is set to be equal to a distance between axes of the two female threaded rivets 52 of the support base 42. In the plate 36, two circular holes 64 are formed at two positions close to the center relative to the opposite ends in the longitudinal direction of the plate 36. When the washer 30 is attached to the back side of the squeegee 10 (FIGS. 8 to 11), these circular holes 64 receive the nuts 20 (FIG. 4) of the squeegee 10 (FIG. 11) and thereby serve to suppress large displacement of the washer 30 relative to the squeegee 10. The shafts of the hand screws 38 are inserted through the screw passing holes 62 of the plate 36 and the retaining washers 40 are fitted to the shafts inserted through the screw passing holes 62, on the rear side of the plate 36. Consequently, assembled part B (FIG. 8A) in which the hand screws 38 are rotatably fitted in the plate 36 is formed.

Figure 8A:
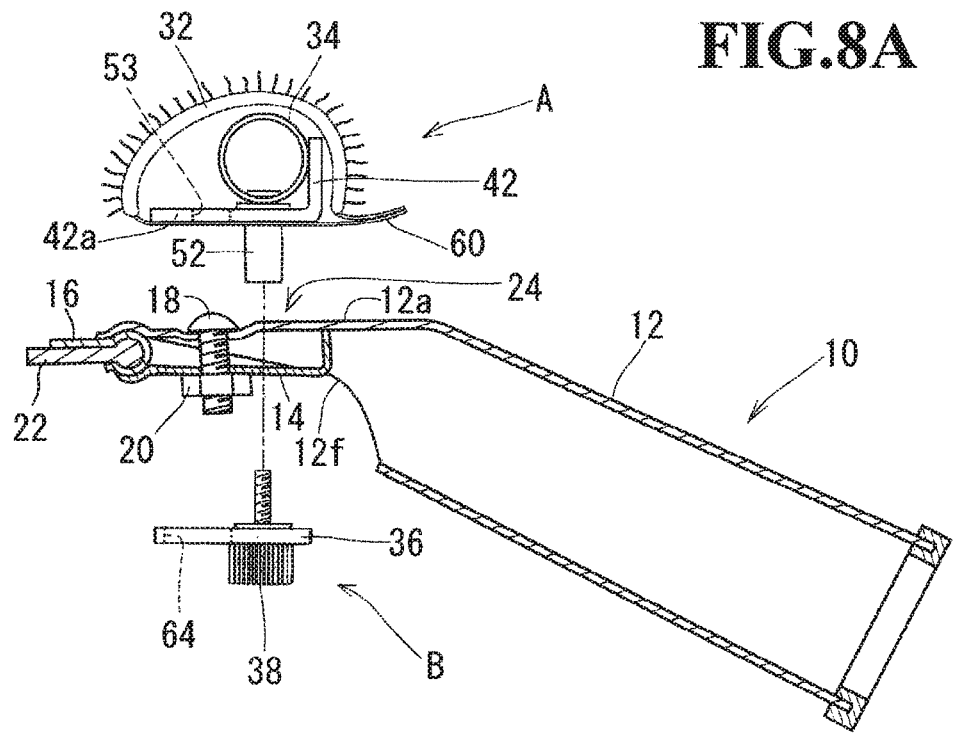
FIGS. 8A and 8B are diagrams illustrating a manner in which the components of the removable washer in FIG. 1 are assembled into two assembled parts, and then, while the two assembled parts are assembled to each other, the washer is attached to the back side of the squeegee in FIGS. 2 to 4. In these figures.
Figure 8B:
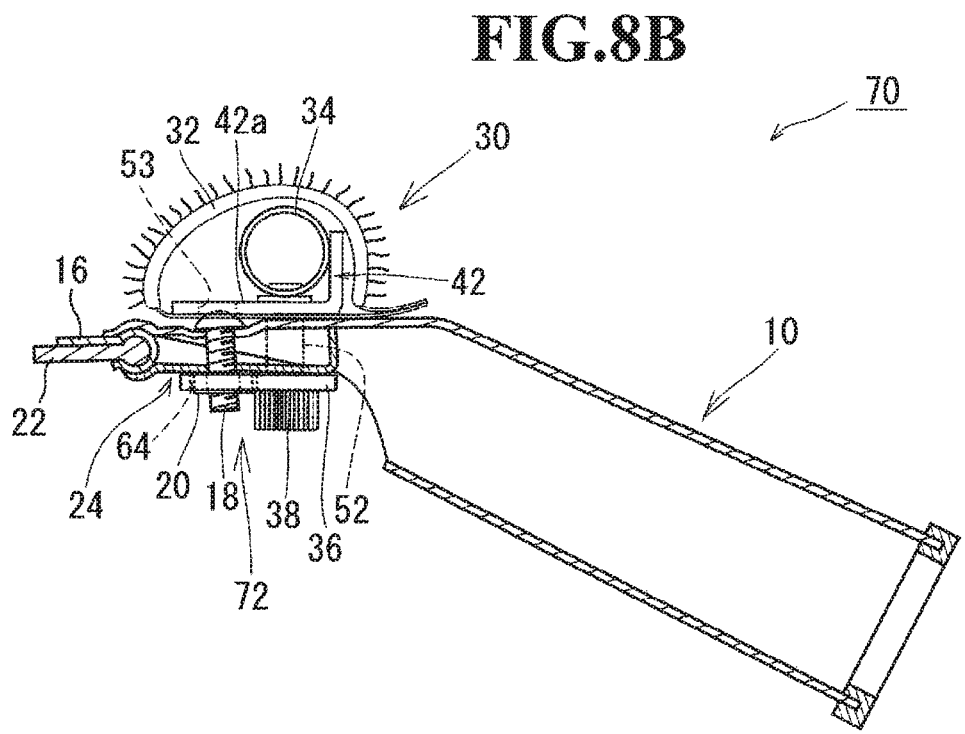

FIG. 8 illustrate a manner in which while the above two assembled parts A and B are assembled to each other, the washer 30 is attached to the squeegee 10. FIG. 8 indicate a case where the washer 30 is attached to the back side of the squeegee 10. The assembling and attachment are performed as follows. First, as illustrated in FIG. 8A, assembled part A is disposed on the back side of the flat portion 24 of the squeegee 10 and assembled part B is disposed on the front side of the flat portion 24, with the flat portion 24 therebetween, assembled parts A and B are brought close to each other to respective positions at which distal ends of the hand screws 38 and the distal ends of the female threaded rivets 52 come into abutment with each other. Here, the flat portion 24 is disposed in the space between the two sets of the shaft of a hand screw 38 and a female threaded rivet 52. Next, as a result of each of the shafts of the two hand screws 38 being tightly screwed into a female thread of the female threaded rivet 52 facing the hand screw 38, as illustrated in FIG. 8B, the washer 30 is assembled, and simultaneously with the assembling, the flat portion 24 is clamped between the support base 42 and the plate 36 in a thickness direction and the washer 30 is thus attached to the squeegee 10, whereby a combination squeegee 70 (washer-equipped squeegee) is completed. In this state, the nuts 20 of the squeegee 10 are received in the circular holes 64 of the plate 36. Also, the base portion 42a of the support base 42 is supported on the head 12a of the handle 12 and the plate 36 is supported on the back plate 14, and the base portion 42a and the plate 36 are thereby made to be substantially parallel to each other. As described above, attachment of the washer 30 to the squeegee 10 is completed.

Figure 9:
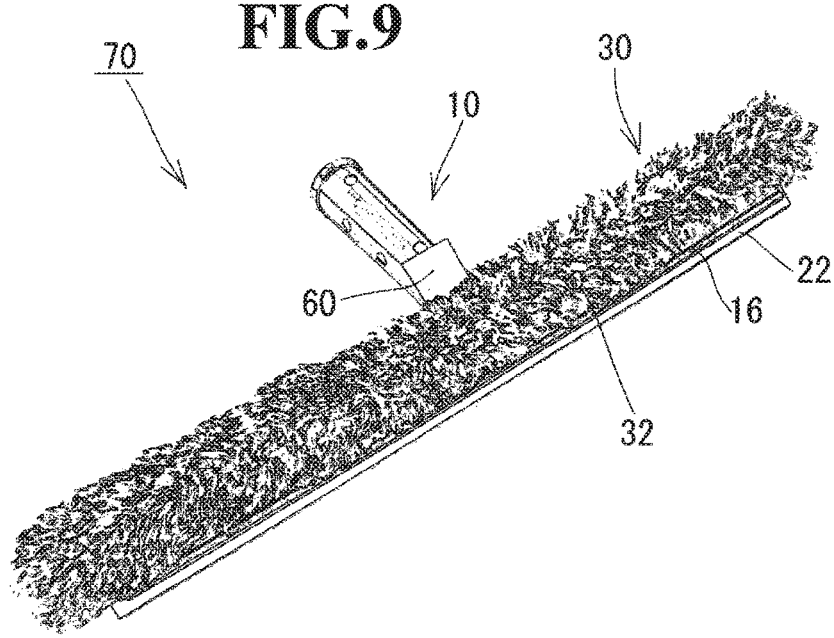
FIG. 9 is a perspective view of a combination squeegee in FIG. 8B obtained by attachment of the washer to the back side of the squeegee, as viewed from the back side of the squeegee.
Figure 10:
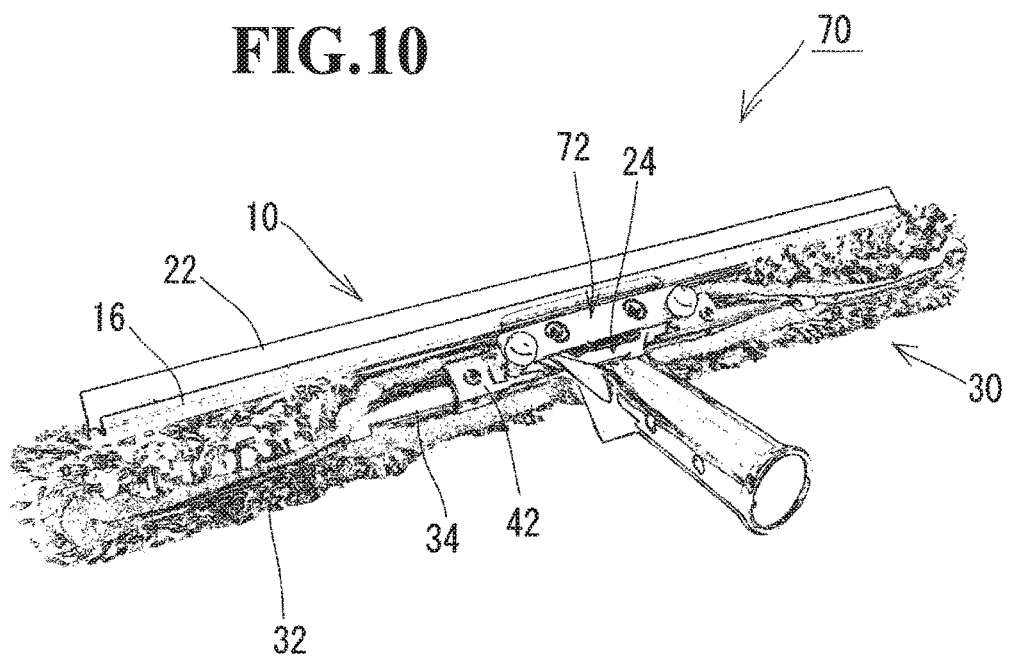
FIG. 10 is a perspective view of the combination squeegee in FIG. 8B as viewed from the front side of the squeegee.
Figure 11:
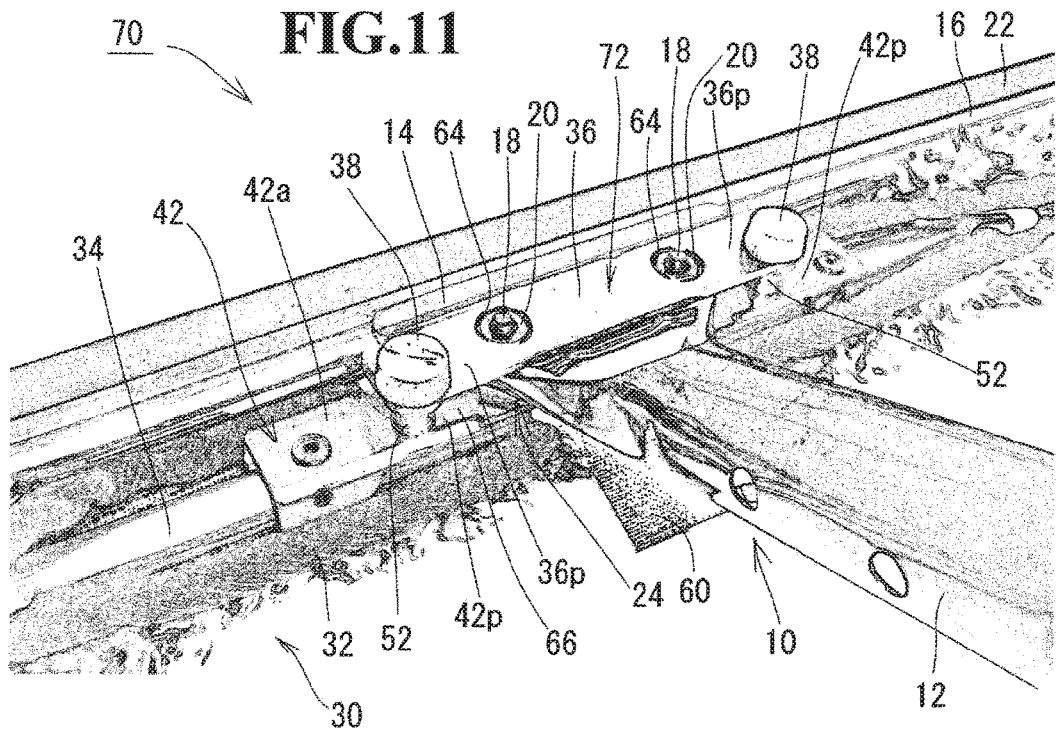
FIG. 11 is an enlarged view of a clamping portion in FIG. 10.

FIGS. 9 and 10 illustrate the combination squeegee 70 completed as described above. FIG. 9 illustrates the combination squeegee 70 as viewed from the back side of the squeegee 10, and FIG. 10 illustrates the combination squeegee 70 as viewed from the front side of the squeegee 10. Also, FIG. 11 is an enlarged view of a clamping portion 72 in FIG. 10. The clamping portion 72 includes oppositely disposed portions and a fastening mechanism. The oppositely disposed portions are formed of the base portion 42a and the plate 36 disposed facing each other. The fastening mechanism is formed of two pairs of a female threaded rivet 52 and a hand screw 38. The oppositely disposed portions (the base portion 42a and the plate 36) include respective extensions 42p and 36p disposed so as to extend on opposite, right and left, sides of the flat portion 24, and the fastening mechanism is disposed in the extensions 42p and 36p. The flat portion 24 of the squeegee 10 is inserted into a space 66 surrounded by the oppositely disposed portions (the base portion 42a and the plate 36) and the fastening mechanism (two pairs of a female threaded rivet 52 and a hand screw 38). In this state, upon the oppositely disposed portions being fastened to each other by the fastening mechanism, the flat portion 24 is firmly clamped between the oppositely disposed portions in the thickness direction or the flat portion 24. Consequently, the squeegee 10 and the washer 30 are integrated. Also, as illustrated in FIG. 11, the two nuts 20 of the squeegee 10 are received in the two circular holes 64 of the plate 36, and thus, large displacement of the washer 30 relative to the squeegee 10 is suppressed by engagement between inner circumferential surfaces of the two circular holes 64 and outer circumferential surfaces of the two nuts 20.

The combination squeegee 70 in FIGS. 9 and 10 is used as follows. The impregnation body 32 is impregnated with a wash solution, and the back side of the squeegee 10 is directed toward a glass window surface, the glass window surface is wiped with the impregnation body 32 to apply the wash solution to the glass window surface. Next, the front and back of the combination squeegee 70 are reversed to direct the front side of the squeegee 10 toward the glass window surface, and the wash solution is rubbed off from the glass window surface by the front edge 22a of the rubber 22. Glass window cleaning is performed as described above. The female threaded rivets 52 are loosened to disassemble the washer 30 into assembled parts A and B as in FIG. 8A, whereby the washer 30 can be removed from the squeegee 10.

Although in the description, an engagement portion is formed by the nuts 20 being received in the circular holes 64 of the plate 36, the engagement portion in the plate 36 can be formed even if no circular holes 64 are provided. For example, in a plate 36' in FIG. 12, no circular holes are formed. At a front edge 36a of the plate 36' is placed on nuts 20 and is engaged with and thereby supported by a side surface of a distal end part 18a of each screw 18, the distal end part 18a projecting from the relevant nut 20, and a rear edge 36b of the plate 36' is engaged with and thereby supported by an obliquely rising cutout 12f at a boundary between a head 12a and a grip 12b in a lower surface of a handle 12. As a result of the plate 36' and a support base 42 being fastened to each other by hand screws 38 in this state, the washer 30 is stably attached to the squeegee 10. Or, although the illustration is omitted, the washer 30 can stably be attached to the squeegee 10 by forming the plate 36' so as to have a wide width, forming holes or cutouts for avoiding nuts 20 in the wide plate, making the front edge 36a of the wide plate be engaged with and thereby supported by a rising portion 14b at a position on the front side of the back plate 14, making the rear edge 36b of the wide plate be engaged with and thereby supported by the obliquely rising cutout 12f in the lower surface of the handle 12, and fastening the wide plate and the support base 42 to each other via the hand screws 38.

FIGS. 13 to 16 illustrate a combination squeegee 70' obtained by attachment of the washer 30 to the front side of the squeegee 10, which is opposite to that of FIGS. 8 to 11. The combination squeegee 70' is formed of components that are completely the same as those of the combination squeegee 70 in FIGS. 8 to 11. The combination squeegee 70' is different from the combination squeegee 70 only in that a direction of attachment of the washer 30 to the squeegee 10 is reversed in terms of the front and the back, and the washer 30 can be attached to and removed from the squeegee in a method that is similar to the method described with reference to FIGS. 8 to 11. In the case where the washer 30 is attached to the front side of the squeegee 10, as illustrated in FIG. 16 (for convenience of description, FIG. 16 illustrates a state with the impregnation body 32 removed), the distal end parts 18a of the two screws 18 of the squeegee 10, the distal end parts 18a projecting from the two nuts 20, are received in two circular holes 53 of the base portion 42a, respectively, and thus, large displacement of the washer 30 relative to the squeegee 10 is suppressed with engagement between inner circumferential surfaces of the two circular holes 53 and the outer circumferential surfaces of the two screw distal end parts 18a.

The combination squeegee 70' in FIGS. 13 to 16 is used as follows. The impregnation body 32 is impregnated with a wash solution, and the front side of the squeegee 10 is directed toward a glass window surface. In this state, the glass window surface is wiped with positions of the impregnation body 32 and the rubber 22 kept so as to simultaneously abut against the glass window surface. Consequently, while the wash solution is applied to the glass window surface by the impregnation body 32, the wash solution can be rubbed off from the glass window surface by the rubber 22 at the same time. Consequently, cleaning work can be conducted efficiently.

Figure 12:
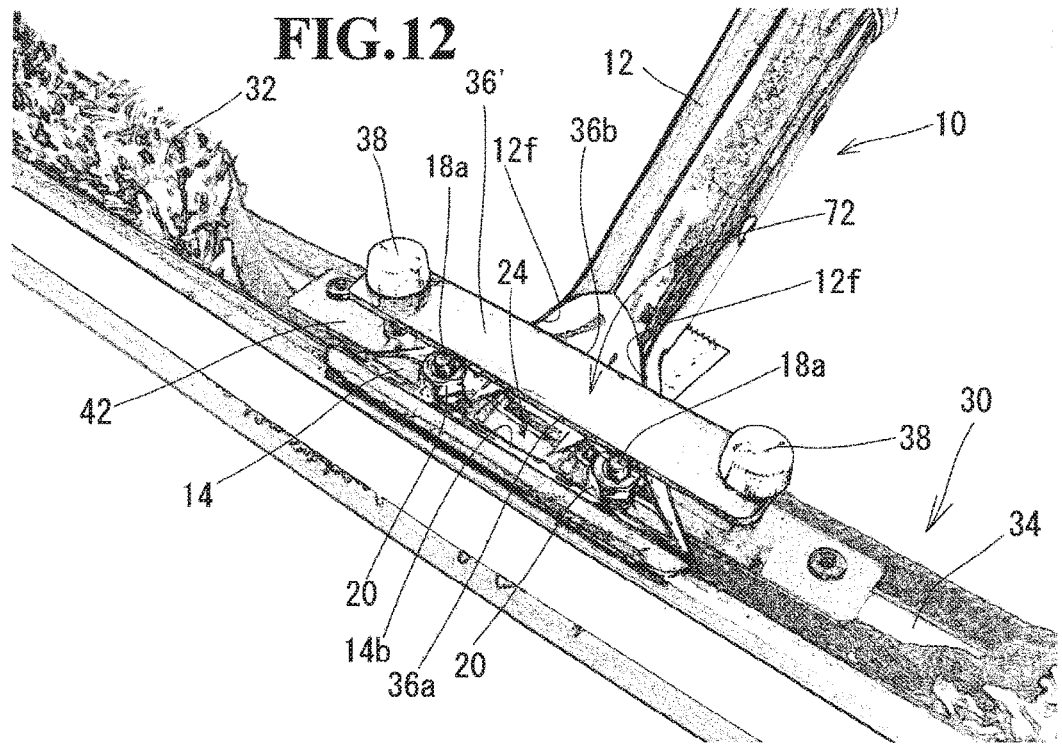
FIG. 12 is a diagram of an alteration of Embodiment 1 and is a perspective view illustrating a state in which a washer is attached to the back side of a squeegee using a plate with no circular holes as viewed from the front side of the squeegee.
Figure 13:
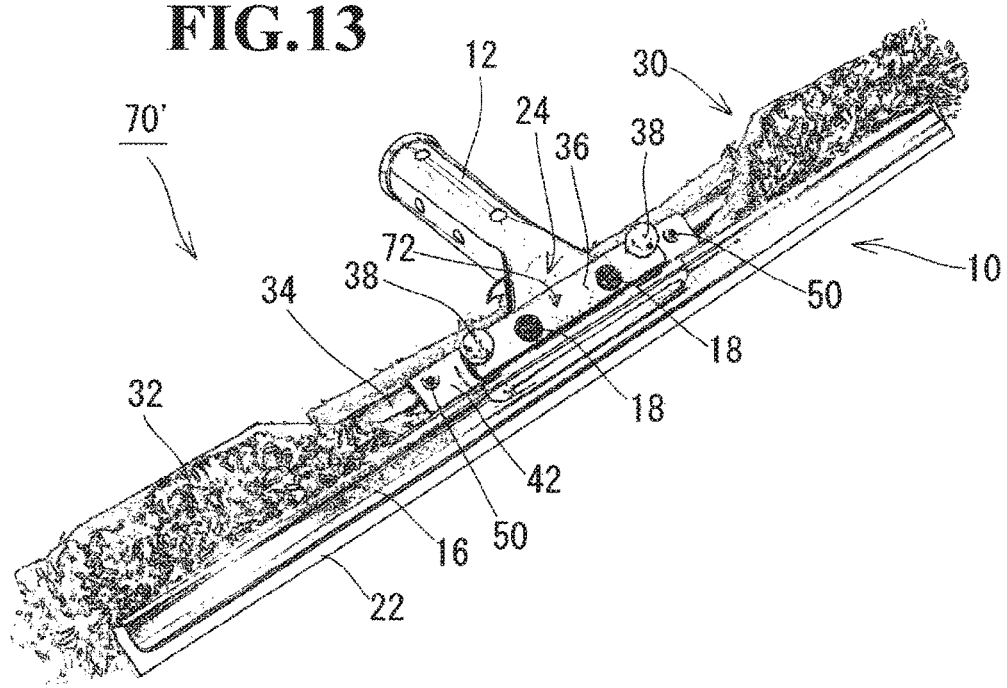
FIG. 13 is a perspective view of a combination squeegee obtained by attachment of the removable washer in FIG. 1 to the front side of the squeegee in FIGS. 2 to 4, as viewed from the back side of the squeegee.
Figure 14:
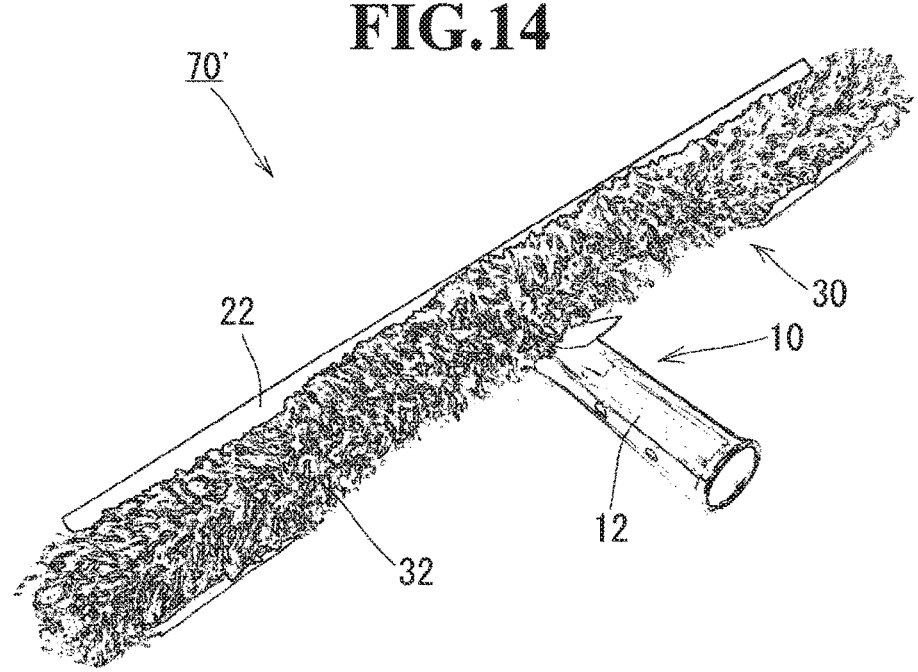
FIG. 14 is a perspective view of the combination squeegee in FIG. 13 as viewed from the front side of the squeegee.
Figure 15:
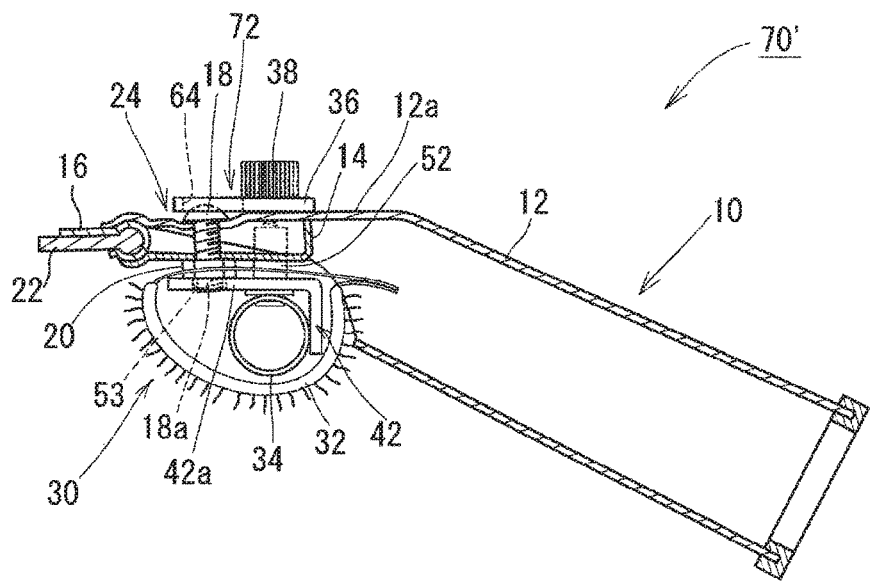
FIG. 15 is a cross-sectional view of the combination squeegee in FIGS. 13 and 14 cut along a plane that, is the same as that of FIGS. 8A and 8B.
Figure 17:
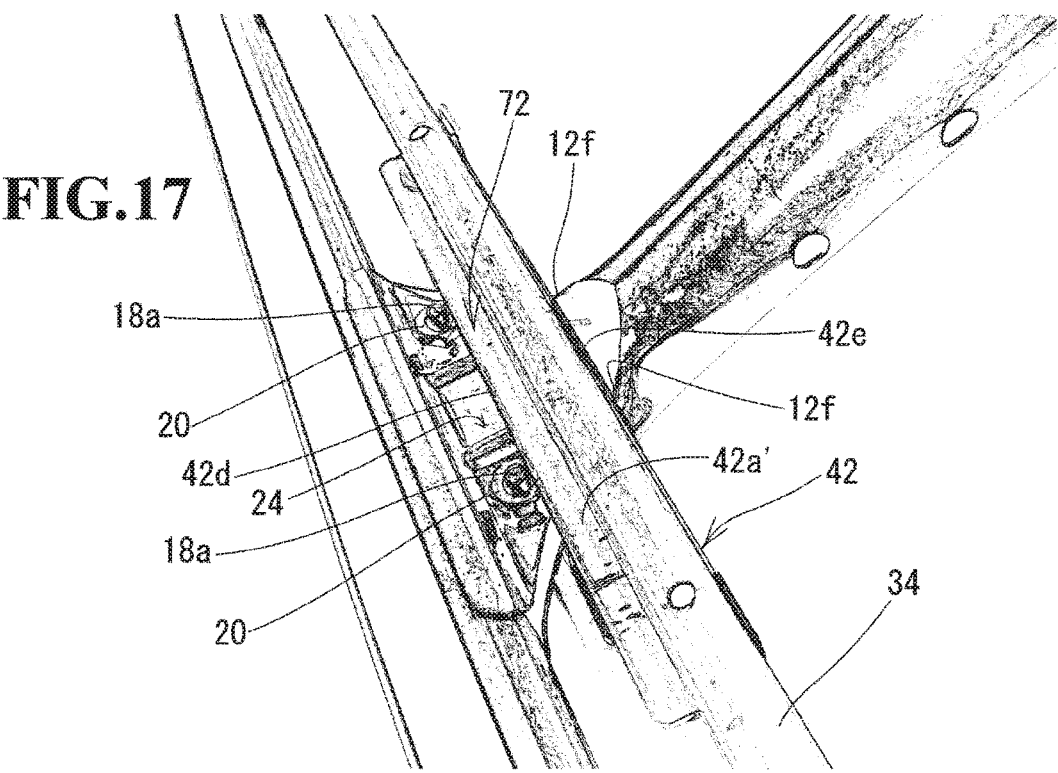
FIG. 17 is a diagram illustrating an alteration of Embodiment 1 and is a perspective view of a washer (illustrated in such a manner that an impregnation body is removed) attached to the front side of a squeegee using a support base with no circular holes, as viewed from the front side of the squeegee.

Also, in the case where the washer 30 is attached to the front side of the squeegee 10, an engagement portion can be formed in the base portion 42a without providing the circular holes 53 in the base portion 42a, in the same manner as in FIG. 12 (example in which an engagement portion is formed using the plate 36 with no circular holes). FIG. 17 illustrates an example configured as described above. For convenience of description, FIG. 17 illustrates a state with an impregnation body 32 removed. In the base portion 42a', no circular holes are formed. A front edge 42d of the base portion 42a' is placed on the nuts 20 and is engaged with and thereby supported by the side surfaces of the distal end parts 18a of the screws 18, the distal end parts 18a projecting from the nuts 20. A rear edge 42e of the base portion 42a' is engaged with and thereby supported by the obliquely rising cutout 12f in the lower surface of the handle 12. As a result of the plate 36 and the support base 42 being fastened to each other via hand screws 38 in this state, the washer 30 is stably attached to the squeegee 10. Here, the front edge (part corresponding to the front edge 36a in FIG. 12) of a plate 36 can be engaged with and thereby supported by side surfaces or inclined surfaces of heads of the screws 18 slightly projecting from the head 12a of the handle 12 on the back side of the squeegee 10. Or, it is possible to use the wide plate described in relation to FIG. 12 instead of the plate 36, and make the front edge of the wide plate be engaged with and thereby supported by the rising portion 12g (FIGS. 2 and 3) at a position on the front side of the head 12a of the handle 12.

Although in Embodiment 1, the support base 42 is attached to the core member 34, if the core member 34 is robustly formed, the hand screws 38 can be screwed directly into the core member 34. In such case, the support base 42 can be omitted. In this case, the core member 34 itself doubles as a part of the attachment portion.

Also, although in Embodiment 1, the base portion 42a and the plate 36 are fastened to each other using the screws 38 on both right and left sides of the flat portion 24, instead of this case, for example, it is possible to join the base portion 42a and the plate 36 via a hinge on one side of the right and left sides of the flat portion 24 and join and fasten the base portion 42a and the plate 36 to each other using a screw or a buckle on the other side of the right and left sides.

Embodiment 2

Figure 18:
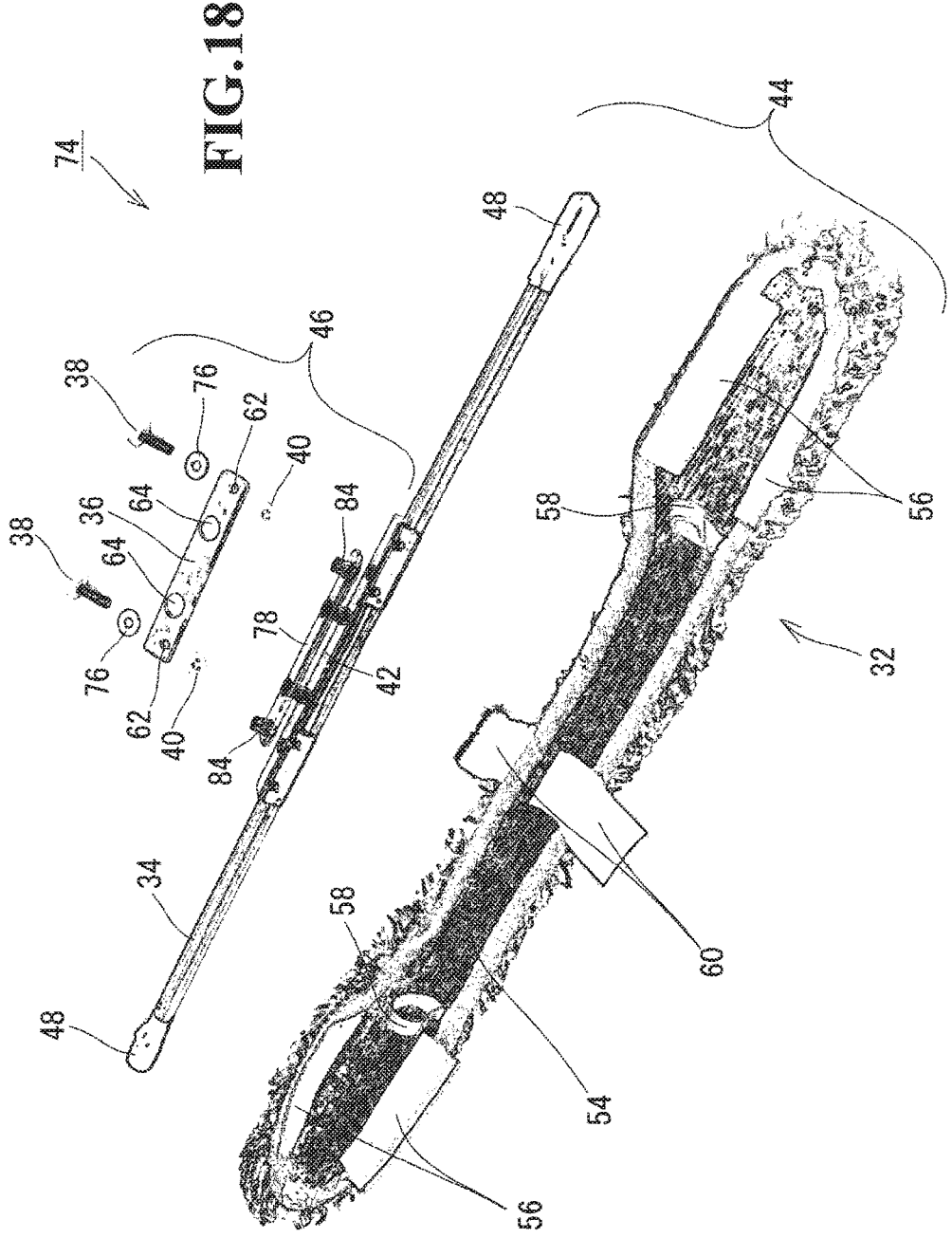
FIG. 18 is an exploded perspective view illustrating components of a removable washer according to Embodiment 2 of this invention.

Embodiment 2 of a removable washer according to this invention will be described. This removable washer is one obtained by adding an auxiliary plate on the base portion 42a of the support base 42 in Embodiment 1 to cause the flat portion 24 to be clamped between the auxiliary plate and the plate 36. As in Embodiment 1, this removable washer can be removably attached to either of the back side and the front side of the squeegee 10 in FIGS. 2 to 4. In Embodiment 2, for parts corresponding to those in Embodiment 1, reference numerals used in Embodiment 1 are used. FIG. 18 is an exploded perspective view of a removable washer 74 according to Embodiment 2. The washer 74 includes, e.g., an impregnation body 32, a rod-like (straight rod-like) core member 34, a plate 36, two hand screws 38, washers 76, and retaining washers 40 for the hand screws 38. A support base 42 is mounted on a center in a longitudinal direction of the core member 34 via, e.g., rivets. An auxiliary plate 78 is attached on the support base 42 via, e.g., rivets. As with the plate 36, the auxiliary plate 78 is formed of, for example, an aluminum plate (flat plate) having a thickness of around 2 mm. The impregnation body 32 and the core member 34 form a main body 44 of the washer 74. The support base 42 having the auxiliary plate 78, the plate 36, the hand screws 38, the washers 76, and the retaining washers 40 form an attachment portion 46 that removably attaches the main body 44 to the squeegee 10.

Figure 19:
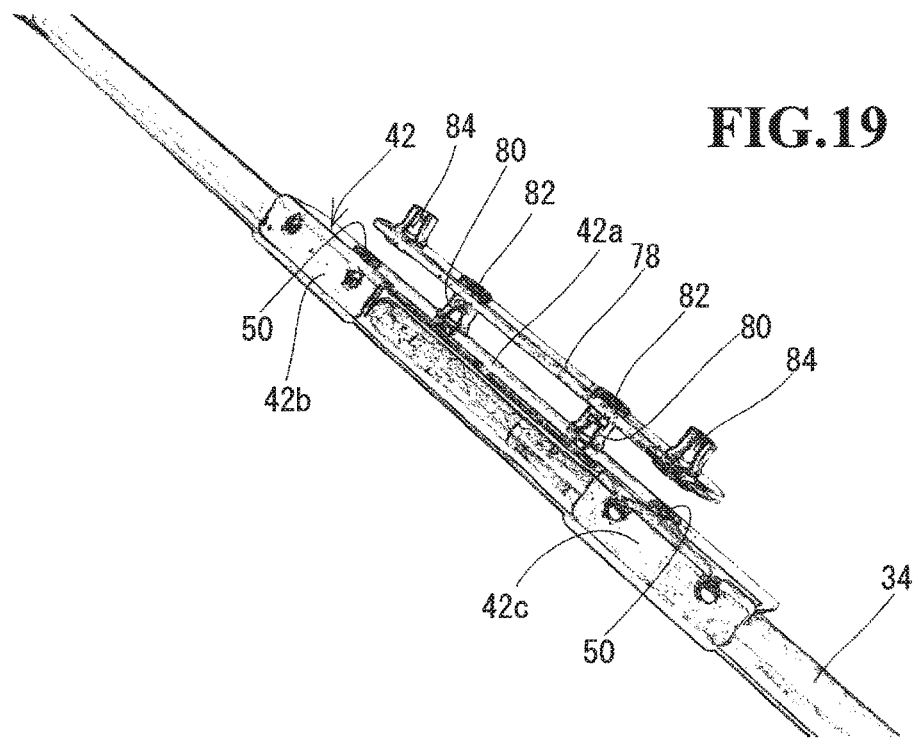
FIG. 19 is an enlarged view of a part of a core member in FIG. 18 to which the support base is attached.
Figure 20:
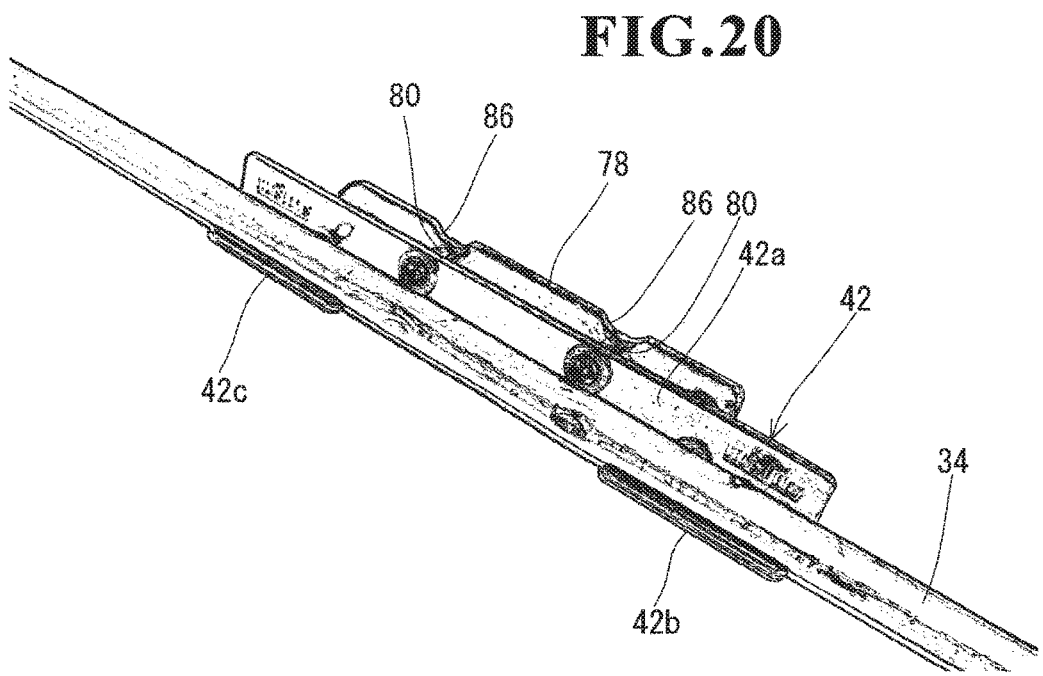
FIG. 20 is an enlarged view of the part in FIG. 19 as viewed from the rear side.

Configurations of the support base 42 and the auxiliary plate 78 will be described with reference to the enlarged views in FIGS. 19 and 20. On the core member 34, the support base 42 is attached to a center in a longitudinal direction of the core member 34, via two blind rivets 50. Two female threaded rivets 80 are attached on the base portion 42a of the support base 42. The auxiliary plate 78 is supported on the female threaded rivets 80. Screws 82 are inserted through screw passing holes (not illustrated) formed in the auxiliary plate 78, from the upper side of the auxiliary plate 78, and screwed into female threads of the female threaded rivets 80, whereby the auxiliary plate 78 is joined to the support base 42 via the female threaded rivets 80. In the auxiliary plate 78, two female threaded rivets 84 are attached at respective positions around opposite ends in a longitudinal direction of the auxiliary plate 78. As illustrated in FIG. 20, in the auxiliary plate 78, a cutout 86 is formed at each of two positions of left and right at a front edge of the auxiliary plate 78. The cutouts 86 are engaged with the nuts 20 when the washer 74 is attached to the front side of the squeegee 10.

Figure 21:
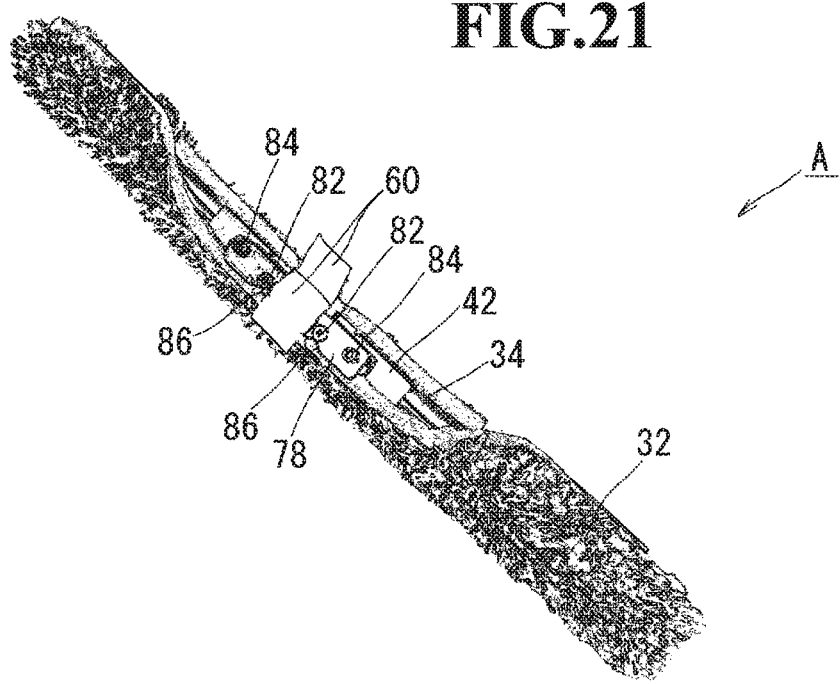
FIG. 21 is a perspective view illustrating an assembled part obtained by an impregnation body being assembled to the core member in FIG. 18.

The core member 34 is covered by an impregnation body 32 (FIG. 18) according to a procedure that is similar to that of Embodiment 1. FIG. 21 illustrates assembled part A formed by the core member 34 being covered by the impregnation body 32. Also, the washers 76 are fitted to the shafts of the hand screws 38 (FIG. 18), and the shafts are inserted through screw passing holes 62 of the plate 36 and fitted in the retaining washers 40 on the rear side of the plate 36. Consequently, assembled part B in which the hand screws 38 are rotatably fitted in the plate 36 is formed (individual illustration of assembled part B omitted).

Assembled parts A and B are attached to the squeegee 10 according to the following procedure. The flat portion 24 of the squeegee 10 is disposed in a space between the two female threaded rivets 84, the plate 36 is disposed on the female threaded rivets 84, and the shafts of the hand screws 38 attached to the plate 36 are firmly screwed into female threads of the female threaded rivets 84. Consequently, the flat portion 24 is clamped between the auxiliary plate 78 and the plate 36, whereby the washer 74 is attached to the squeegee 10.

Figure 22:
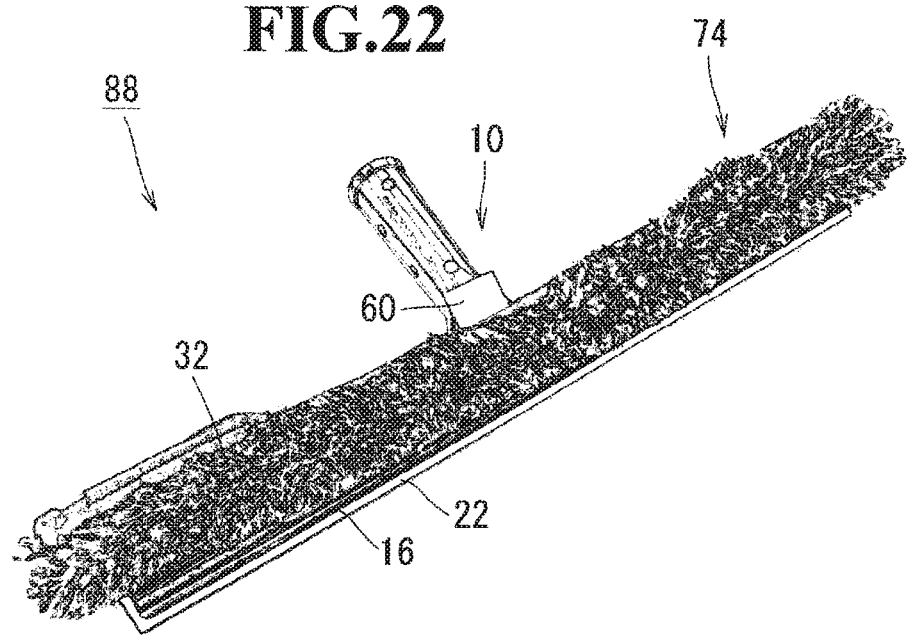
FIG. 22 is a perspective view of a combination squeegee obtained by attachment of the washer in FIG. 18 to the back side of the squeegee in FIG. 2 to FIG. 4, as viewed from the back side of the squeegee.
Figure 23:
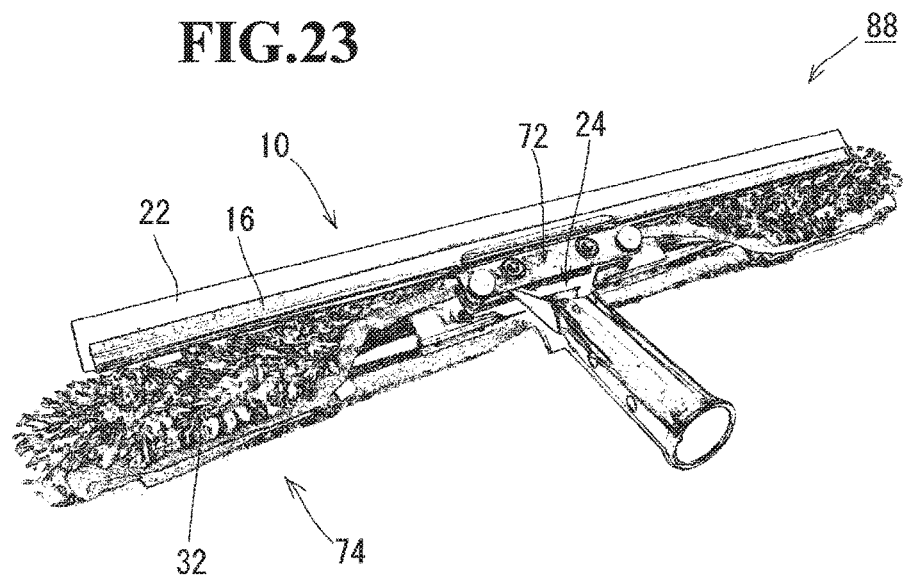
FIG. 23 is a perspective view of the combination squeegee in FIG. 22 as viewed from the front side of the squeegee.
Figure 24:
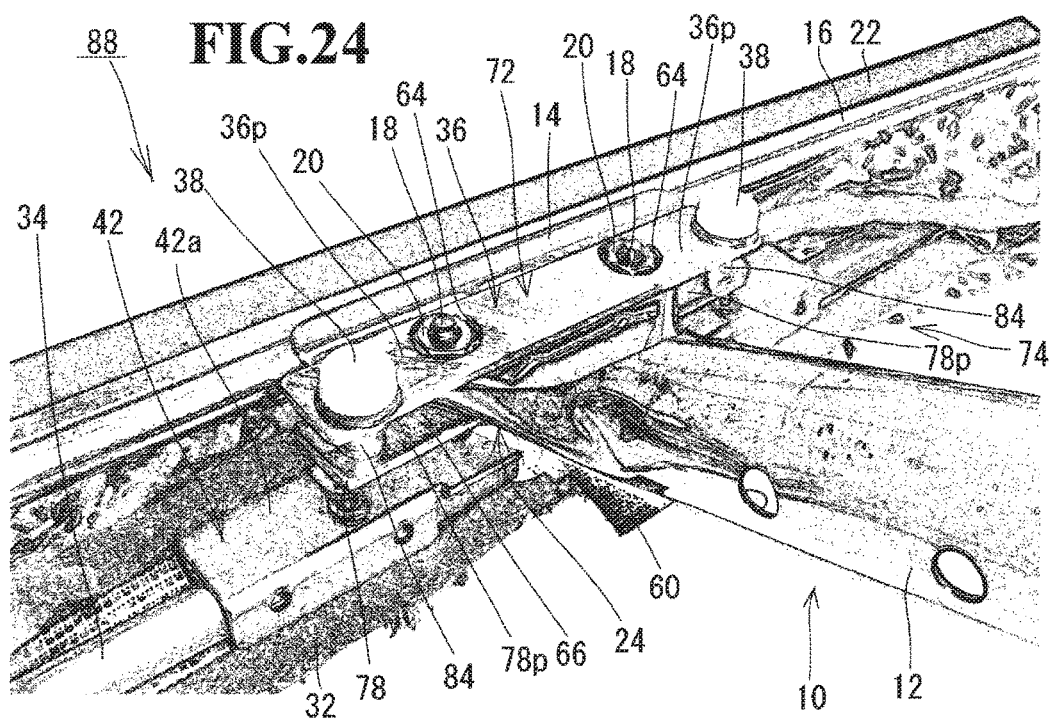
FIG. 24 is an enlarged view of a clamping portion in FIG. 23.

FIGS. 22 and 23 illustrate a combination squeegee 88 obtained by attachment of the washer 74 to the back side of the squeegee 10. FIG. 22 illustrates the combination squeegee 88 as viewed from the back side of the squeegee 10, and FIG. 23 illustrates the combination squeegee 88 as viewed from the front side of the squeegee 10. Also, FIG. 24 is an enlarged view of a clamping portion 72 in FIG. 23. The clamping portion 72 includes oppositely disposed portions and a fastening mechanism. The oppositely disposed portions are formed of the auxiliary plate 78 and the plate 36 disposed facing each other. The fastening mechanism is formed of two sets of a female threaded rivet 84 and a hand screw 38. The oppositely disposed portions (the auxiliary plate 78 and the plate 36) include respective extensions 78p and 36p disposed so as to extend on opposite, right and left, sides of the flat portion 24. The fastening mechanism is disposed in the extensions 78p and 36p. The flat portion 24 of the squeegee 10 is inserted into a space 66 surrounded by the oppositely disposed portions (the auxiliary plate 78 and the plate 36) and the fastening mechanism (two sets of a female threaded rivet 84 and a hand screw 38). In this state, upon the oppositely disposed portions being fastened to each other by the fastening mechanism, the flat portion 24 is firmly clamped between the oppositely disposed portions in the thickness direction of the flat portion 24. Consequently, the squeegee 10 and the washer 74 are integrated. Also, as illustrated in FIG. 24, the two nuts 20 of the squeegee 10 are received in two circular holes 64 of the plate 36, and thus, large displacement of the washer 74 relative to the squeegee 10 is suppressed by engagement between inner circumferential surfaces of the two circular holes 64 and outer circumferential surfaces of the two nuts 20.

Figure 25:
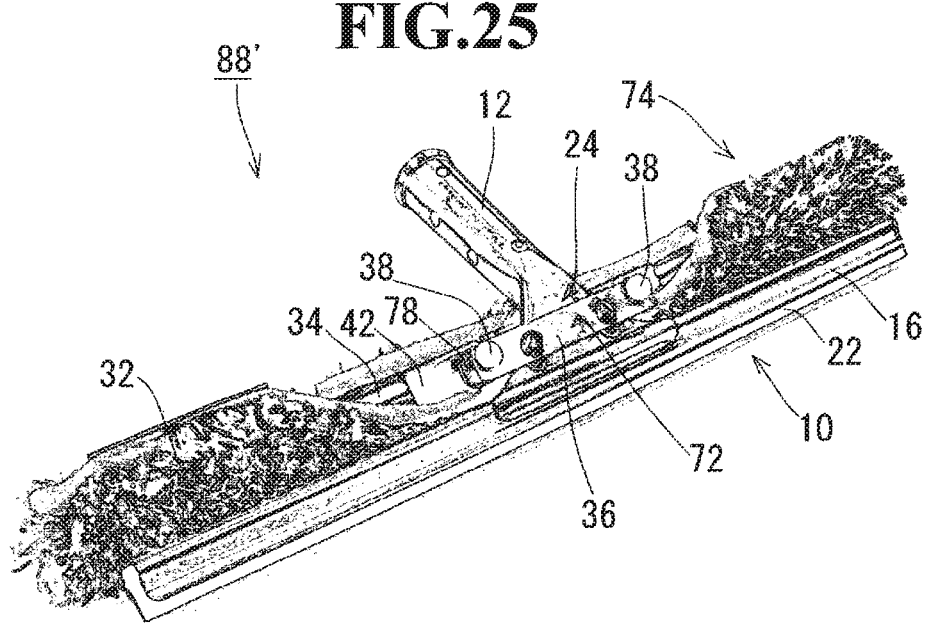
FIG. 25 is a perspective view of a combination squeegee obtained by attachment of the washer in FIG. 18 to the front side of the squeegee in FIGS. 2 to 4, as viewed from the back side of the squeegee.
Figure 26:
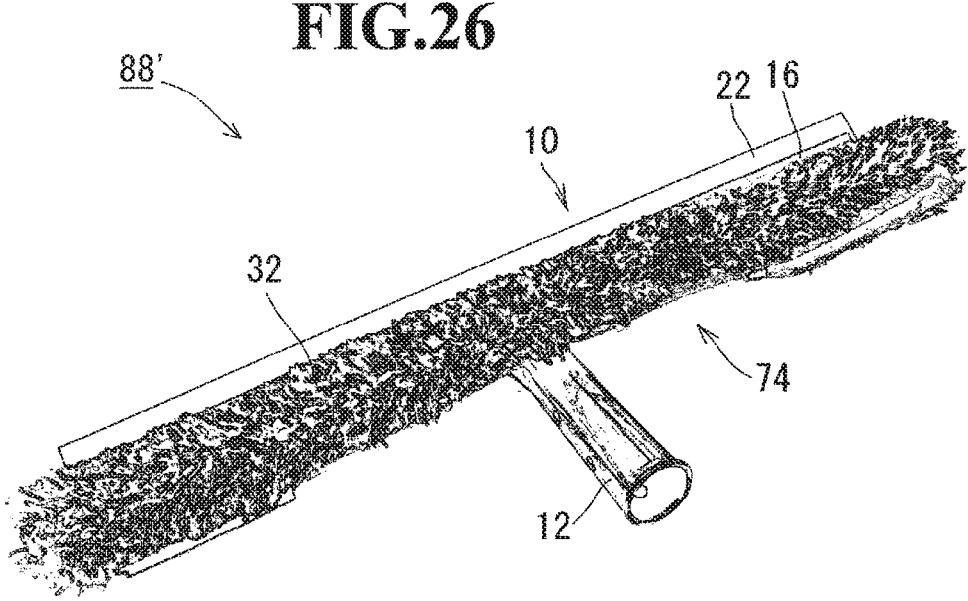
FIG. 26 is a perspective view of the combination squeegee in FIG. 25 as viewed from the front side of the squeegee.
Figure 27:
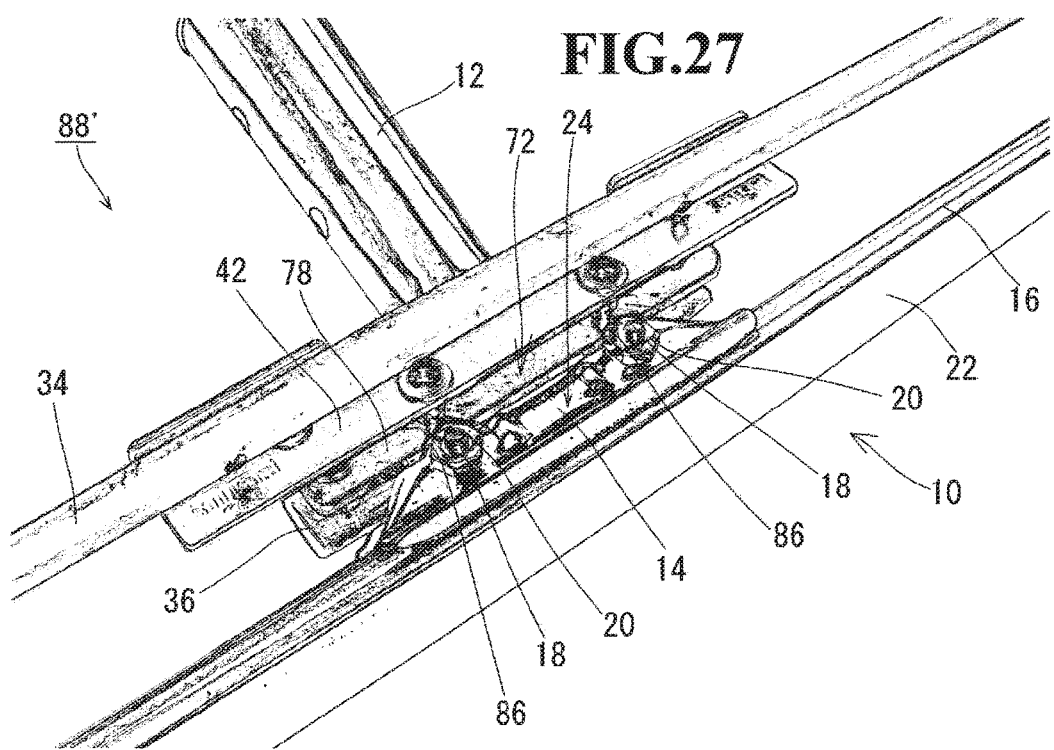
FIG. 27 is a diagram illustrating the combination squeegee in FIG. 25 and FIG. 26 with the impregnation body removed and is a perspective view of the combination squeegee as viewed from the front side of the squeegee.

FIGS. 25 to 27 indicate a combination squeegee 88' obtained by attachment of the washer 74 to the front side of the squeegee 10, which is opposite to that of FIGS. 22 to 24. For convenience of description, FIG. 27 illustrates a state with the impregnation body 32 removed. The combination squeegee 88' is formed of components that are completely the same as those of the combination squeegee 88 in FIGS. 22 to 24. In the case where the washer 74 is attached to the front side of the squeegee 10, as illustrated in FIG. 27, the two nuts 20 of the squeegee 10 are partly received in the two cutouts 86 of the auxiliary plate 78, and thus, large displacement of the washer 74 relative to the squeegee 10 is suppressed by engagement between inner circumferential surfaces of the two cutouts 86 and the outer circumferential surfaces of the two nuts 20.

Embodiment 3

Figure 28:
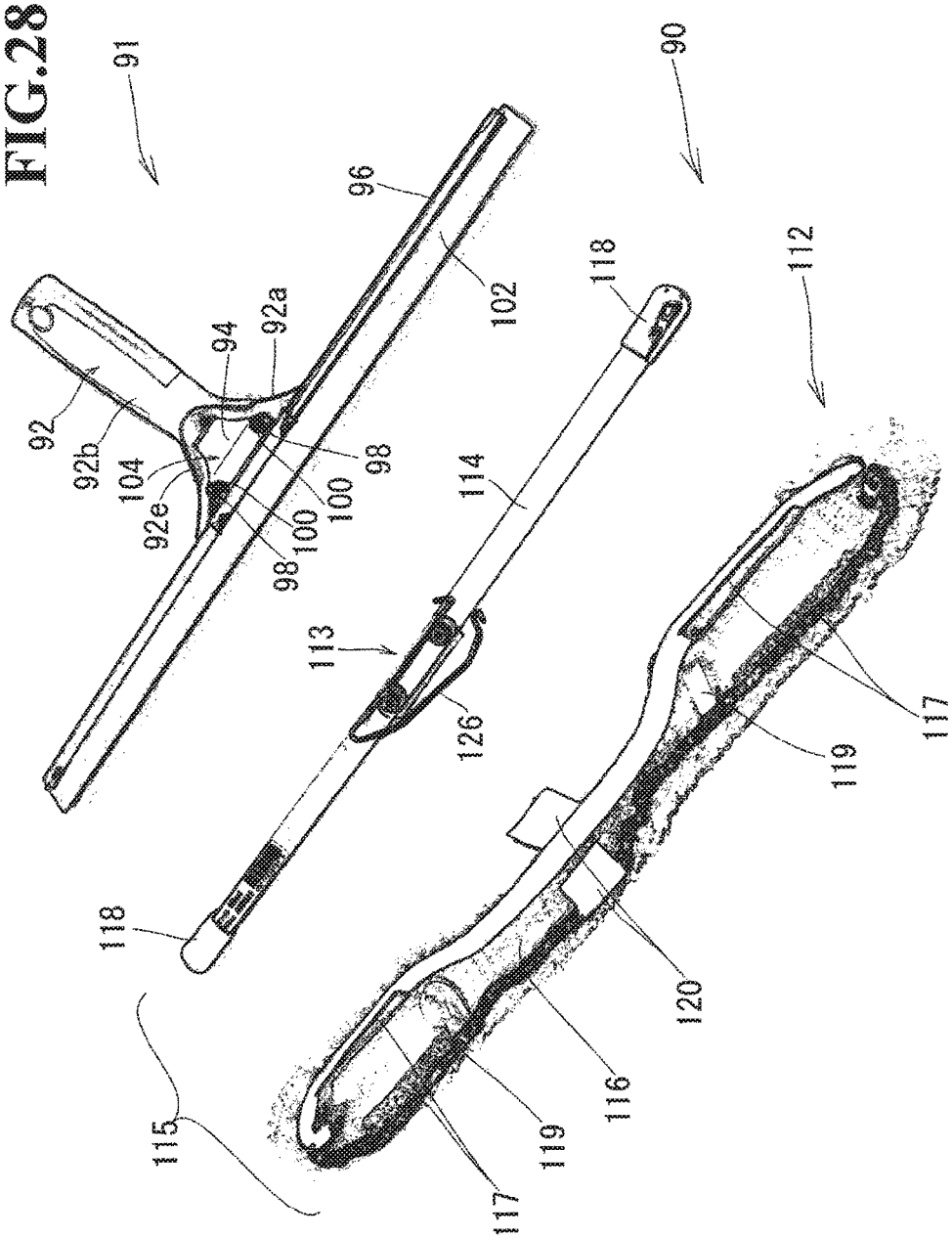
FIG. 28 is an exploded perspective view illustrating components of a removable washer according to Embodiment 3 of this invention and is a perspective view illustrating a conventional squeegee that allows the removable washer to be removably attached thereto.

Embodiment 3 of a removable washer according to this invention will be described. In this removable washer, a clamping portion is formed by bending a wire spring material. FIG. 28 is an exploded perspective view of a removable washer 90 and illustrates a conventional squeegee 91 to which the removable washer 90 according to Embodiment 3 can be removably attached. For the squeegee 91, a handle of an "ERGOTEC" (registered trademark) manufactured by Unger Enterprises, LLC. is used and illustrated as viewed from the front side. The squeegee 91 is formed of a handle 92, a back plate 94 of a metal, a channel 96 of a metal, two screws 98, two nuts 100, and a rubber 102 fitted on the channel 96 along a longitudinal direction thereof. The handle 92 is formed of a head 92a of a metal and a grip 92b of a synthetic resin, which are integrally joined to each other. The head 92a is formed in a fan-like shape that is wide compared to the grip 92b. The back plate 94 is formed in a fan-like shape of a size that allows the back plate 94 to be received in a depression 92e on the front side of the head 92a. The back plate 94 of a plate spring type is received in the depression 92e on the front side of the head 92a of the handle 92, the channel 96 is clamped at a distal end between the head 92a and the back plate 94, and the head 92a and the back plate 94 are fastened to each other by the two sets of a screw 98 and a nut 100, whereby the handle 92 and back plate 94 are joined to each other, the channel 96 is clamped at the distal end between the head 92a of the handle 92 and the back plate 94, and the handle 92, the back plate 94 and the channel 96 are assembled and integrated in such a manner that disassembling is possible. The channel 96 can be removed from or attached to the handle 92 with one-touch operation by firmly pressing a rear portion of the plate-spring back plate 94 with a finger to pivot a front portion of the back plate 94 upward around positions of the screws 98. The head 92a at the distal end of the handle 92 forms a flat portion 104 that is at compared to the 92b.

The washer 90 can be removably attached to the back side of the squeegee 91. A configuration of the washer 90 will be described. The washer 90 includes an impregnation body 112 and a rod-like (straight rod-like) core member 114. The impregnation body 112 and the core member 114 form a main body 115 of the washer 90. On the core member 114, an attachment portion 113 that removably attaches the main body 115 to the squeegee 91 is attached to a center in a longitudinal direction of the core member 114.

The core member 114 is formed of, for example, an L-shaped aluminum plate having a length that is roughly equal to that of the channel 96, a width of around 12 mm and a thickness of around 1 mm. Each of opposite ends of the core member 114 is covered by and thereby fitted with a cap 118 of, e.g., vinyl or rubber.

Figure 29:
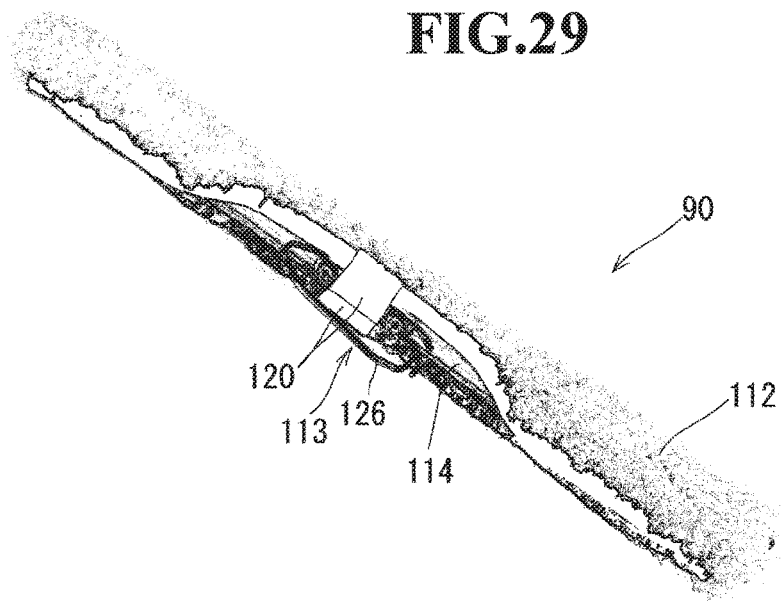
FIG. 29 is a perspective view illustrating the washer in FIG. 28 as assembled.

The impregnation body 112 has a structure that is substantially the same as that of the impregnation body 32 in Embodiments 1 and 2. In other words, for the impregnation body 112, a raised fabric having a raised front surface is used and the impregnation body 112 is fabricated by sewing the fabric into a sac-like shape. At a side of the impregnation body 112, an opening 116 for inserting/removing the core member 114 is formed over a substantially entire length of the side. At parts around opposite ends in a longitudinal direction of the opening 116 in an inner circumferential surface of the opening 116 of the impregnation body 112, two pairs of hook-and-loop fasteners 117 for openably closing the parts around the opposite ends of the opening 116 are sewn and thereby attached along edges of the opening 116 that face each other. An elastic string 119 is sewn and attached at each of two positions close to a center relative to the opposite ends in the longitudinal direction of the opening 116 in the inner circumferential surface of the opening 116 of the impregnation body 112. These elastic strings 119 are intended to let right and left parts of the core member 114 through, respectively. In the impregnation body 112, at a center position in the longitudinal direction of the impregnation body 112, a pair of hook-and-loop fasteners 120 for openably closing a part at the center position of the opening 116 is sewn and attached to edges of the opening 116 that faces each other. According to the above configuration, while the left and right parts of the core member 114 are let through via the respective elastic strings 119, the core member 114 is inserted to the inside of the impregnation body 112 from the opening 116, and subsequently, the right and left hook-and-loop fasteners 117 and the center hook-and-loop fasteners 120 are closed, whereby the washer 90 assembled as illustrated in FIG. 29 is formed.

Figure 30:
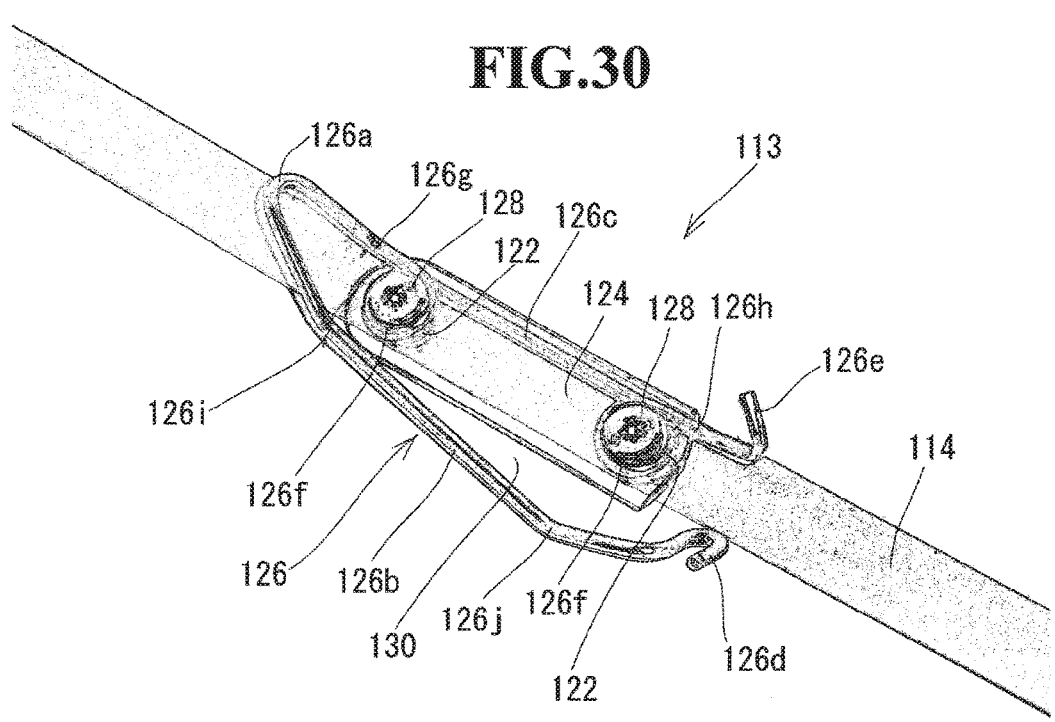
FIG. 30 is an enlarged view of a part of a core member in FIG. 28 to which an attachment portion is attached.
Figure 31:
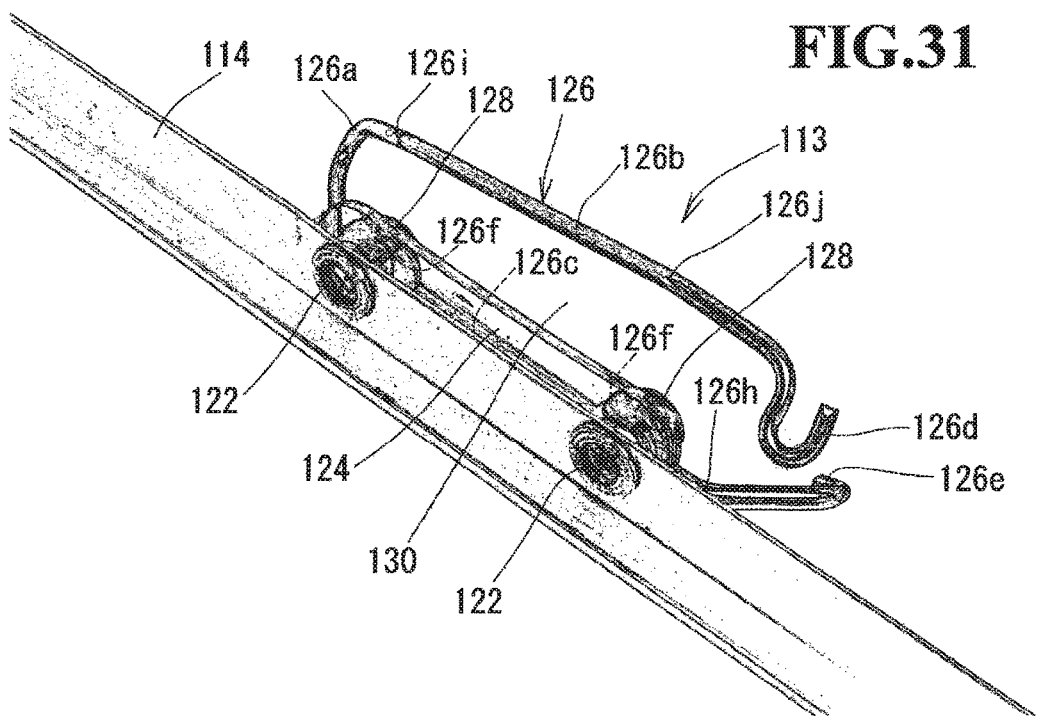
FIG. 31 is an enlarged view of the part in FIG. 30 as viewed from the rear side.

A configuration of the attachment portion. 113 attached to the core member 114 will be described with reference to the enlarged views in FIGS. 30 and 31. In the core member 114, two female threaded rivets 122 are attached to a rear surface of the center in the longitudinal direction of the core member 114. One transparent vinyl washer 124 is fitted in common on both shafts of the female threaded rivets 122. A wire spring 126 formed by bending one wire spring material is attached in common to both female threaded rivets 122. The wire spring 126 includes a folded portion 126a formed at an intermediate position in a longitudinal direction thereof, two wire portions 126b and 126c disposed facing each other with the folded portion 126a therebetween, hooks 126d and 126e formed at respective free ends of the two wire portions 126b and 126c, two wound portions 126f formed in one wire portion 126c, two flexed portions 126g and 126h formed in one wire 126c, and two flexed portions 126i and 126j formed in the other wire portion 126b. The female threaded rivets 122 are inserted through respective hollows of the wound portions 126f, and screws 128 are screwed into respective female threads of the female threaded rivets 122, whereby the wire spring 126 is attached to the rear side of the core member 114. The hook 126d and 126e can manually be hooked on and unhooked from each other freely. FIGS. 30 and 31 illustrate the hooks 126d and 126e unhooked from each other. A space 130 that lets the flat portion 104 (FIG. 28) of the squeegee 91 therethrough and receives the flat portion 104 is formed between the two wire portions 126b and 126c facing each other.

Attachment of the washer 90 to the squeegee 91 is performed as follows. As in FIG. 29, in a state in which the washer 90 is assembled by the core member 114 being covered by the impregnation body 112, the hooks 126d and 126e of the wire spring 126 are unhooked from each other. In a position in which the washer 90 is disposed on the back side of the squeegee 91, the flat portion 104 is slid into the space 130 of the wire spring 126 from between the hooks 1269d and 126e. After the flat portion 104 being received in the space 130, the hooks 126d and 126e are manually brought close to and hooked on each other to close the space 130 against a force of the flat portion 104 pressing the space 130 so as to expand by a thickness of the flat portion 104 (that is, a force extending a distance between the hooks 126d and 126*e*). Here, the nuts 100 of the squeegee 91 are hooked on and engaged with the flexed portions 126*i* and 126*j*. Consequently, the washer 90 is stably attached to the back side of the squeegee 91.

Figure 32:
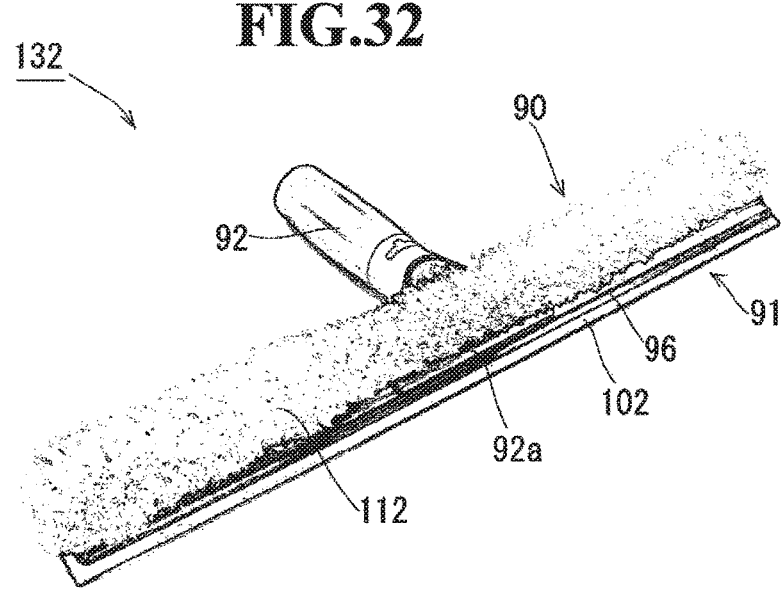
FIG. 32 is a perspective view of a combination squeegee obtained by attachment of the washer in FIG. 29 to the back side of the squeegee in FIG. 28, as viewed from the back side of the squeegee.
Figure 35:
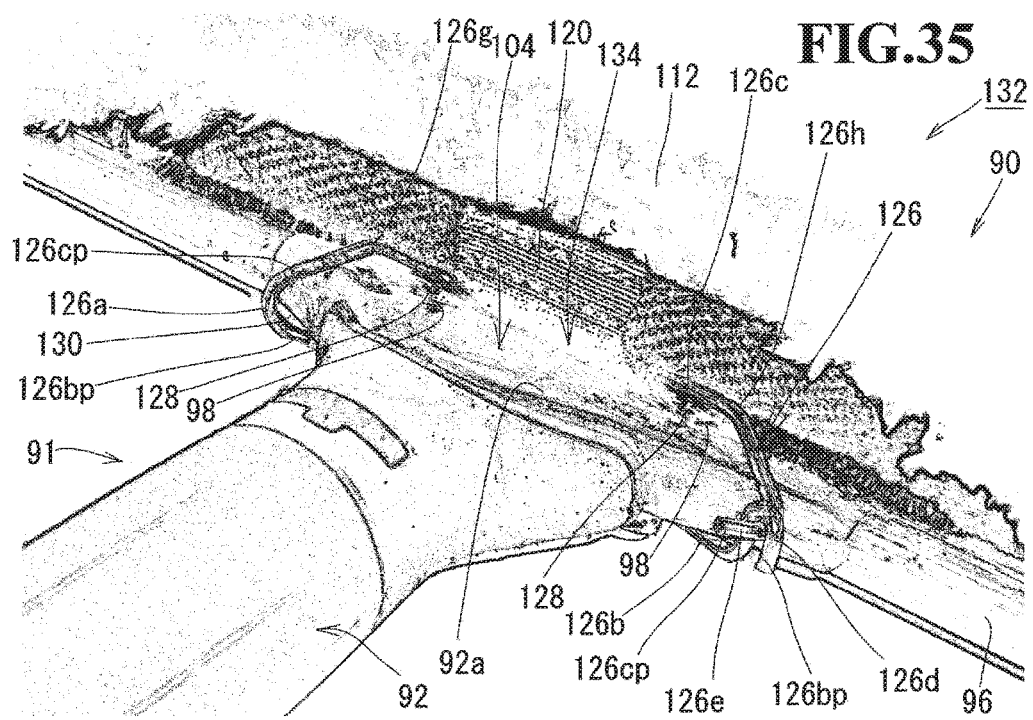
FIG. 35 is an enlarged view illustrating the back side of the clamping portion in FIG. 34.

FIGS. 32 and 33 illustrate a combination squeegee 132 obtained by attachment of the washer 90 to the back side of the squeegee 91. FIG. 32 illustrates the combination squeegee 132 as viewed from the back side of the squeegee 91, and FIG. 33 illustrates the combination squeegee 132 as viewed from the front side of the squeegee 91. Also, FIG. 34 is an enlarged view of a clamping portion 134 in FIG. 33. FIG. 35 illustrates the back side of the clamping portion 134. As illustrated in FIG. 34, the wire portion 126*b* is firmly engaged with two cutouts 92*c* of right and left in a lower surface of the head 92*a* and the two nuts 100. Also, as illustrated in FIG. 35, heads of the two screws 128 fixing the wire portion 126*c* is firmly engaged with a surface of the head 92*a* or heads of the screws 98. The clamping portion 134 includes oppositely disposed portions and a fastening mechanism. The oppositely disposed portions are formed of the wire portions 126*b* and 126*c* disposed facing each other. The fastening mechanism is formed of the folded portion 126*a* and the hooks 126*d* and 126*e*. The oppositely disposed portions (wire portions 126*b*, 126*c*) include respective extensions 126*bp* and 126*cp* disposed so as to extend on opposite, right and left, sides of the flat portion 104, and the fastening mechanism is disposed in the extensions 126*bp* and 126*cp*. The flat portion 104 of the squeegee 91 is inserted through the space 130 surrounded by the oppositely disposed portions (wire portions 126*b* and 126*c*) and the fastening mechanism (the folded portion 126*a* and the hooks 126*d* and 126*e*). As a result of the oppositely disposed portions being fastened to each other by the fastening mechanism, the flat portion 104 is firmly clamped between the oppositely disposed portions in the thickness direction of the flat portion 104. Consequently, the squeegee 91 and the washer 90 are integrated. Also, as illustrated in FIG. 34, large displacement of the washer 90 relative to the squeegee 91 is suppressed by engagement between inner circumferential surfaces of the flexed portions 126*i* and 126*j* of the wire portion 126*b* and outer circumferential surfaces of the two nuts 100.

Although in each of the above embodiments, the clamping portion clamps only the flat portion of the handle, the clamping portion can be configured so as to clamp not only the flat portion but also the grip.

The invention claimed is:

1. A removable washer configured to be removably attached to a squeegee, which includes a channel attached to a flat portion at a distal end of a handle, the removable washer comprising:
   a main body including an impregnation body, and an attachment portion configured to removably attach the main body to the handle,
   wherein the attachment portion includes a clamping portion configured to removably clamp the flat portion of the handle, wherein
   the clamping portion includes:
   oppositely disposed portions disposed facing each other, the oppositely disposed portions being configured to clamp therebetween the flat portion of the handle in a thickness direction of the flat portion; and
   a fastener that fastens the oppositely disposed portions to each other so as to configure the oppositely disposed portions to clamp the flat portion of the handle therebetween, wherein
   the fastener is configured to fasten the oppositely disposed portions to each other without penetrating the flat portion of the handle, and
   wherein the oppositely disposed portions are configured to form a space therebetween, for receiving the flat portion of the handle, when fastened to each other by the fastener.

2. The removable washer according to claim 1, wherein:
   the oppositely disposed portions each include an extension configured to extend on each of a right side and a left side of the flat portion of the handle; and
   the fastener fastens the oppositely disposed portions to each other via the right and left extensions.

3. The removable washer according to claim 2, wherein the oppositely disposed portions include an engagement portion configured to be engaged with at least any one of a channel attachment screw attached to the flat portion of the squeegee, a nut screwed to the screw, an obliquely rising cutout in a lower surface of the handle of the squeegee, a rising portion at a position on a front side of a back plate of the squeegee and a rising portion at a position on a front side of a head of the handle of the squeegee.

4. The removable washer according to claim 2, wherein:
   the oppositely disposed portions include two plates disposed facing each other, the two plates configured to clamp, therebetween, the flat portion of the handle in the thickness direction of the flat portion; and
   the fastener includes a screw that fastens the two plates to each other.

5. The removable washer according to claim 3, wherein:
   the oppositely disposed portions include two plates disposed facing each other, the two plates configured to clamp, therebetween, the flat portion of the handle in the thickness direction of the flat portion; and
   the fastener includes a screw that fastens the two plates to each other.

6. The removable washer according to claim 2, wherein:
   the clamping portion includes a wire spring;
   the wire spring includes a folded portion formed at an intermediate position in a length direction, two wire portions disposed facing each other with the folded portion therebetween, the two wire portions clamping the flat portion of the handle in the thickness direction of the flat portion therebetween, and a free end of each of the wire portions;
   the oppositely disposed portions include the two wire portions; and
   the fastener includes a mechanism that fastens the free ends to each other.

7. The removable washer according to claim 3, wherein:
   the clamping portion includes a wire spring;
   the wire spring includes a folded portion formed at an intermediate position in a length direction, two wire portions disposed facing each other with the folded portion therebetween, the two wire portions clamping the flat portion of the handle in the thickness direction of the flat portion therebetween, and a free end of each of the wire portions;
   the oppositely disposed portions include the two wire portions; and
   the fastener includes a mechanism that fastens the free ends to each other.

8. The removable washer according to claim 1, wherein the oppositely disposed portions include an engagement portion configured to be engaged with at least any one of a channel attachment screw attached to the flat portion of the squeegee, a nut screwed to the screw, an obliquely rising cutout in a lower surface of the handle of the squeegee, a rising portion at a position on a front side of a back plate of the squeegee and a rising portion at a position on a front side of a head of the handle of the squeegee.

9. The removable washer according to claim 8, wherein:
the oppositely disposed portions include two plates disposed facing each other, the two plates configured to clamp, therebetween, the flat portion of the handle in the thickness direction of the flat portion; and
the fastener includes a screw that fastens the two plates to each other.

10. The removable washer according to claim 8, wherein:
the clamping portion includes a wire spring;
the wire spring includes a folded portion formed at an intermediate position in a length direction, two wire portions disposed facing each other with the folded portion therebetween, the two wire portions clamping the flat portion of the handle in the thickness direction of the flat portion therebetween, and a free end of each of the wire portions;
the oppositely disposed portions include the two wire portions; and
the fastener includes a mechanism that fastens the free ends to each other.

11. The removable washer according to claim 1, wherein:
the oppositely disposed portions include two plates disposed facing each other, the two plates configured to clamp, therebetween, the flat portion of the handle in the thickness direction of the flat portion; and
the fastener includes a screw that fastens the two plates to each other.

12. The removable washer according to claim 1, wherein the oppositely disposed portions are defined by planar surfaces configured to be fastened together so as to be oriented in respective planes that extend parallel to each other.

13. The removable washer according to claim 12, wherein each of the planar surfaces are provided on respective opposing plates disposed facing each other, the opposing plates being configured to clamp, therebetween, the flat portion of the handle in the thickness direction of the flat portion; and
the fastener includes a screw that fastens the opposing plates to each other.

14. A removable washer configured to be removably attached to a squeegee, which includes a channel attached to a flat portion at a distal end of a handle, the removable washer comprising:
a main body including an impregnation body, and an attachment portion configured to removably attach the main body to the handle,
wherein the attachment portion includes a clamping portion configured to removably clamp the flat portion of the handle, wherein
the clamping portion includes:
oppositely disposed portions disposed facing each other, the oppositely disposed portions being configured to clamp therebetween the flat portion of the handle in a thickness direction of the flat portion; and
a fastener that fastens the oppositely disposed portions to each other so as to configure the oppositely disposed portions to clamp the flat portion of the handle therebetween,
the clamping portion further includes a wire spring;
the wire spring includes a folded portion formed at an intermediate position in a length direction, two wire portions disposed facing each other with the folded portion therebetween, the two wire portions clamping the flat portion of the handle in the thickness direction of the flat portion therebetween, and a free end of each of the wire portions;
the oppositely disposed portions include the two wire portions; and
the fastener includes a mechanism that fastens the free ends to each other.

* * * * *